(12) United States Patent
Kishimoto et al.

(10) Patent No.: US 11,579,741 B2
(45) Date of Patent: Feb. 14, 2023

(54) ELECTRONIC APPARATUS

(71) Applicant: Samsung Display Co., Ltd., Yongin-Si (KR)

(72) Inventors: Hirotsugu Kishimoto, Gyeonggi-do (KR); Dasom Gu, Asan-si (KR); Jaiku Shin, Hwaseong-si (KR); Yongchan Jeon, Cheonan-si (KR); Sung-Ki Jung, Asan-si (KR); Chul Ho Jeong, Seoul (KR); Seungkyun Hong, Cheonan-si (KR); Hyun-Been Hwang, Suwon-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 0 days.

(21) Appl. No.: 17/529,679

(22) Filed: Nov. 18, 2021

(65) Prior Publication Data

US 2022/0221952 A1 Jul. 14, 2022

(30) Foreign Application Priority Data

Jan. 12, 2021 (KR) .................. 10-2021-0003753

(51) Int. Cl.
*G06F 3/046* (2006.01)
*G06F 3/044* (2006.01)

(52) U.S. Cl.
CPC ............ *G06F 3/046* (2013.01); *G06F 3/0446* (2019.05); *G06F 2203/04102* (2013.01); *G06F 2203/04111* (2013.01)

(58) Field of Classification Search
CPC ............ G06F 3/046; G06F 3/0446; G06F 2203/04102; G06F 2203/04111
See application file for complete search history.

(56) References Cited

U.S. PATENT DOCUMENTS

| | | | |
|---|---|---|---|
| 7,019,734 B2 | 3/2006 | Cross et al. | |
| 2014/0362012 A1* | 12/2014 | Lee | G06F 3/046 |
| | | | 345/173 |
| 2017/0278899 A1* | 9/2017 | Yang | G06F 3/0412 |
| 2018/0061893 A1* | 3/2018 | Breedlove | G06F 3/0412 |
| 2018/0136762 A1* | 5/2018 | Jeong | G06F 3/0445 |
| 2019/0235681 A1 | 8/2019 | Li et al. | |
| 2021/0311591 A1 | 10/2021 | Hwang et al. | |
| 2021/0397221 A1 | 12/2021 | Hwang et al. | |

FOREIGN PATENT DOCUMENTS

| | | |
|---|---|---|
| KR | 1020050019885 A | 3/2005 |
| KR | 101872143 B1 | 6/2018 |
| KR | 1020190103872 A | 9/2019 |
| KR | 1020210124608 A | 10/2021 |
| KR | 1020210157946 A | 12/2021 |

* cited by examiner

*Primary Examiner* — Lisa S Landis
(74) *Attorney, Agent, or Firm* — Cantor Colburn LLP

(57) ABSTRACT

An electronic apparatus includes a display module divided into a first non-folding area, a folding area foldable along an imaginary folding axis extending in a second direction crossing a first direction, and a second non-folding area, which are sequentially arranged in the first direction, and a sensing sensor including a first base layer disposed under the display module, first sensing coils disposed on the first base layer, second sensing coils insulated from the first sensing coils, and a first cover layer disposed between the first sensing coils and the second sensing coils. The first cover layer has a modulus less than a modulus of the first base layer.

20 Claims, 16 Drawing Sheets

ELECTRONIC APPARATUS

This application claims priority to Korean Patent Application No. 10-2021-0003753, filed on Jan. 12, 2021, and all the benefits accruing therefrom under 35 U.S.C. § 119, the content of which in its entirety is herein incorporated by reference.

BACKGROUND

1. Field

The disclosure herein relates to an electronic apparatus having improved reliability.

2. Description of the Related Art

Recently, electronic apparatuses including display panels are widely used in various fields as a medium for delivering visual information. Such electronic apparatuses may include liquid crystal displays ("LCD"s), plasma display panels ("PDP"s), organic light emitting displays ("OLED"s), field effect displays ("FED"s), electrophoretic displays ("EPD"s), or the like.

Such an electronic apparatus receives an electrical signal to be activated. The electronic apparatus may include a sensing sensor that senses an input applied from an outside of a display layer for displaying an image.

The electronic apparatus may include various electrode patterns to be activated by an electrical signal. An area on which the electrode patterns are activated may display information or respond to a signal applied to the outside.

SUMMARY

The disclosure provides an electronic apparatus inducing a sensing sensor having improved folding performance.

An embodiment of the invention provides an electronic apparatus including: a display module divided into a first non-folding area, a folding area foldable along an imaginary folding axis extending in a second direction crossing a first direction, and a second non-folding area, which are sequentially arranged in the first direction; and a sensing sensor including a first base layer disposed under the display module, first sensing coils disposed on the first base layer, second sensing coils insulated from the first sensing coils, and a first cover layer disposed between the first sensing coils and the second sensing coils, where the first cover layer has a modulus less than a modulus of the first base layer.

In an embodiment, the sensing sensor may further include a second cover layer disposed on the first cover layer to cover the second sensing coils, and the second cover layer may have a modulus less than a modulus of the first base layer.

In an embodiment, the second sensing coils may not overlap the folding area.

In an embodiment, an opening may be defined through the second cover layer to overlap the folding area such that a side surface of the second cover layer is exposed through the opening, and a portion of the first cover layer overlapping the folding area of the first cover layer may be exposed through the opening.

In an embodiment, the electronic apparatus may further include an adhesive layer disposed between the first base layer and the first cover layer to cover the first sensing coils, where the adhesive layer may bond the first base layer to the first cover layer.

In an embodiment, an opening may be defined through the second cover layer to overlap the folding area such that a side surface of the second cover layer is exposed through the opening, and a portion of the first cover layer overlapping the folding area of the first cover layer may be exposed through the opening.

In an embodiment, the sensing sensor may include an adhesive layer disposed on the first cover layer to cover the second sensing coils and a second base layer disposed on the adhesive layer, where an opening may be defined through the adhesive layer and the second base layer to overlap the folding area such that side surfaces of the adhesive layer and the second base layer, are exposed through the opening, and a portion of the first cover layer overlapping the folding area of the first cover layer may be exposed through the opening.

In an embodiment, the electronic apparatus may further include an additional adhesive layer disposed between the first base layer and the first cover layer to cover the first sensing coils, where the additional adhesive layer may bond the first base layer to the first cover layer.

In an embodiment, the first sensing coils may include first long sides extending in the first direction and spaced apart from each other along the second direction and a first short side extending along the second direction and disposed between the first long sides, and the second sensing coils may include second long sides extending in the second direction and spaced apart from each other along the first direction and a second short side extending along the first direction and disposed between the second long sides.

In an embodiment, the first sensing coils may include first long sides extending in the second direction and spaced apart from each other along the first direction and a first short side extending along the first direction and disposed between the first long sides, and the second sensing coils may include second long sides extending in the first direction and spaced apart from each other along the second direction and a second short side extending along the second direction and disposed between the second long side.

In an embodiment, the first sensing coils may not overlap the folding area.

In an embodiment, each of the first sensing coils may include: extension parts overlapping the first non-folding area and the second non-folding area and extending in the first direction; and a pattern part overlapping the folding area, disposed between the extension parts, and including a concave shape and a convex shape, which are alternately disposed with each other.

In an embodiment, the second sensing coils may not overlap the folding area.

In an embodiment, the first base layer may include polyimide, and the second cover layer may include synthetic rubber, where the synthetic rubber may include at least one selected from butadiene rubber, styrene-butadiene rubber, and butyl rubber.

In an embodiment, the first cover layer may have a modulus in a range of about 10 megapascals (Mpa) to about 100 Mpa.

In an embodiment of the invention, a sensing sensor includes: a first base layer divided into a first non-folding area, a folding area foldable along an imaginary folding axis extending along a second direction crossing a first direction, and a second non-folding area, which are sequentially arranged in the first direction, where the first base layer includes polyimide; first sensing coils disposed on the first base layer; a first cover layer disposed on the first base layer to cover the first sensing coils; and second sensing coils disposed on the first cover layer, where the first cover layer includes synthetic rubber.

In an embodiment, the synthetic rubber may include at least one selected from butadiene rubber, styrene-butadiene rubber, and butyl rubber.

In an embodiment, the sensing sensor may further include a second cover layer disposed on the first cover layer to cover the second sensing coils, where the second cover layer may include a same material as the first cover layer.

In an embodiment, the second sensing coils may not overlap the folding area.

In an embodiment, an opening may be defined through the second cover layer to overlap the folding area such that a side surface of the second cover layer is exposed through the opening, and a portion of the first cover layer overlapping the folding area of the first cover layer may be exposed through the opening.

BRIEF DESCRIPTION OF THE DRAWINGS

The above and other features of embodiments of the invention will become more apparent by describing in further detail embodiments thereof with reference to the accompanying drawings, in which.

DETAILED DESCRIPTION

Figure 1A:
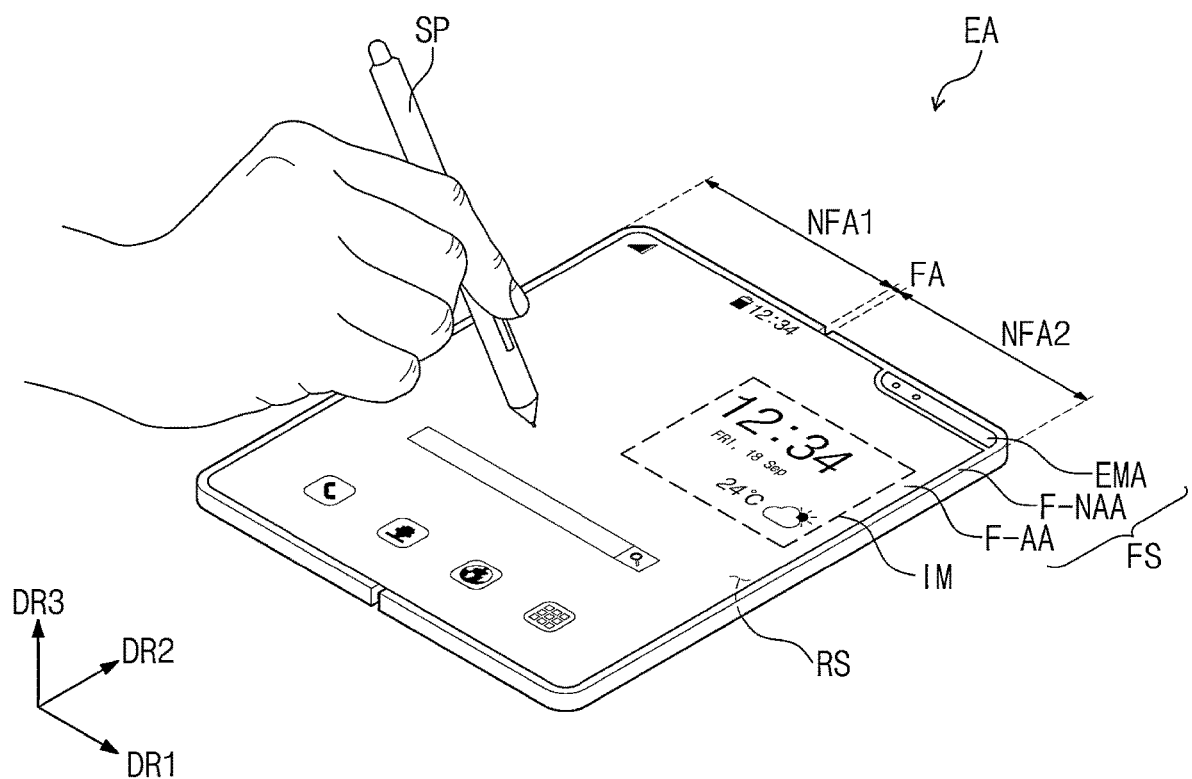
FIG. 1A is a perspective view illustrating an electronic apparatus according to an embodiment of the invention in an unfolded state.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when one component (or area, layer, portion, etc.) is referred to as being 'on', 'connected to', or 'coupled to' another component, it can be directly disposed/connected/coupled on/to the one component, or an intervening third component may be present. In contrast, when an element is referred to as being 'directly on', 'connected directly to', or 'coupled directly to' another element, there are no intervening elements present.

Like reference numerals refer to like elements throughout. Also, in the figures, the thickness, ratio, and dimensions of components are exaggerated for clarity of illustration.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by a person of ordinary skill in the art to which this invention belongs. Also, terms such as defined terms in commonly used dictionaries are to be interpreted as having meanings consistent with meaning in the context of the relevant art and are expressly defined herein unless interpreted in an ideal or overly formal sense.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 1B:
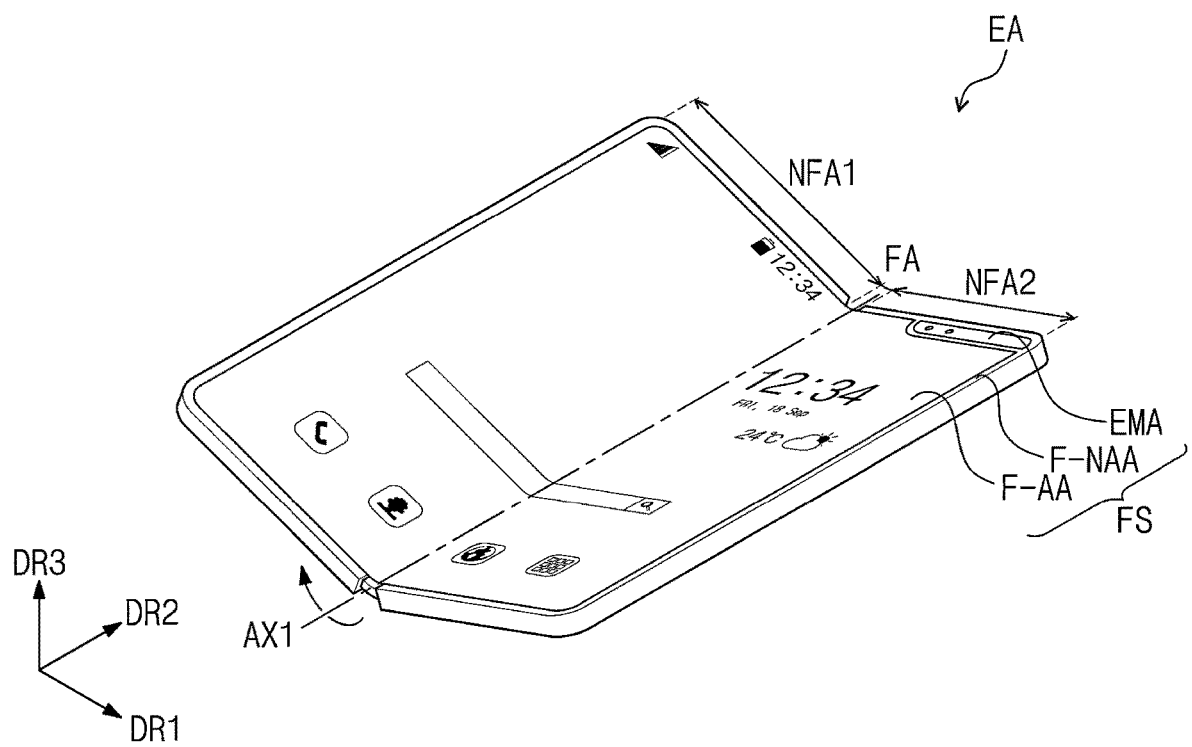
FIG. 1B is a perspective view of the electronic apparatus according to an embodiment of the invention.
Figure 1C:
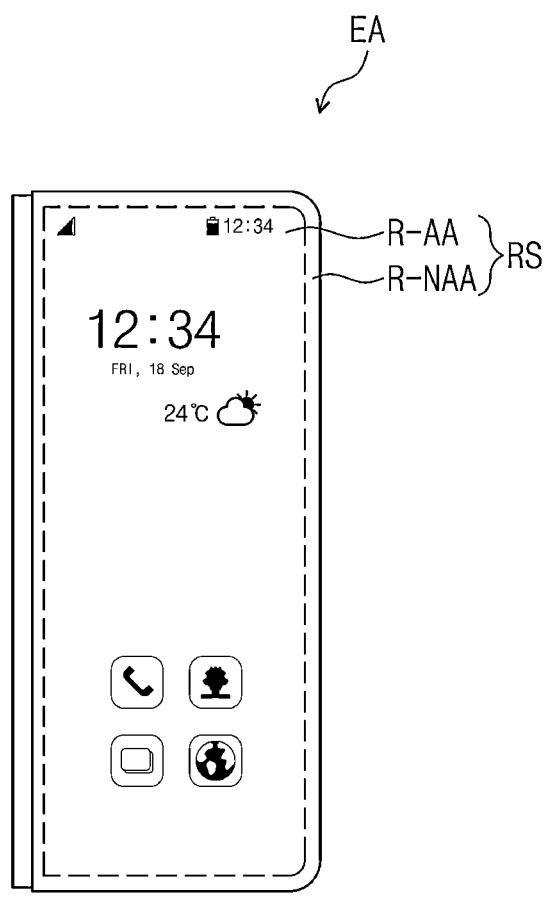
FIG. 1C is a plan view illustrating the electronic apparatus according to an embodiment of the invention in a folded state.
Figure 1D:
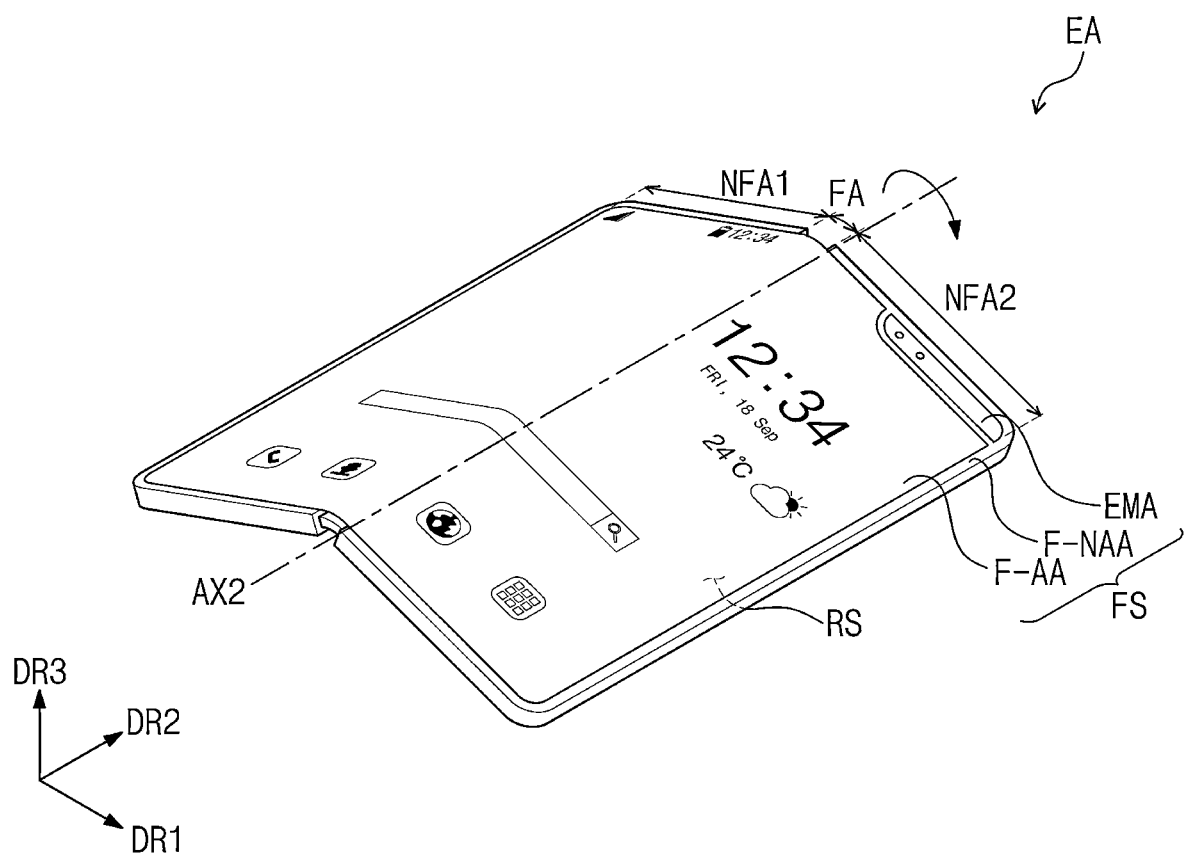
FIG. 1D is a perspective view of the electronic apparatus according to an embodiment of the invention.

FIG. 1A is a perspective view illustrating an electronic apparatus according to an embodiment of the invention in an unfolded state. FIG. 1B is a perspective view of the electronic apparatus according to an embodiment of the invention. FIG. 1C is a plan view illustrating the electronic apparatus according to an embodiment of the invention in a folded state. FIG. 1D is a perspective view of the electronic apparatus according to an embodiment of the invention.

Referring to FIG. 1A, an embodiment of an electronic apparatus EA may be an apparatus that is activated according to an electrical signal. The electronic apparatus EA may include a tablet, a notebook/laptop computer, a computer, a smart television, or the like, for example. Hereinafter, for convenience of description, embodiments where the electronic apparatus EA is a smart phone will be described in detail.

In an embodiment, the electronic apparatus EA may display an image IM in a third direction DR3 (or a thickness direction) on a first display surface FS parallel to each of first and second directions DR1 and DR2. The first display surface FS on which the image IM is displayed may correspond to a front surface of the electronic apparatus EA. The image IM may include a still image as well as a dynamic image. In an embodiment, as shown in FIG. 1A, the image IM may include an Internet search window and a clock window, for example.

In an embodiment, a front surface (or a top surface) or a rear surface (or a bottom surface) of each of constituents may be defined based on a direction in which the image IM is displayed. The front and rear surfaces may be opposite to each other in the third direction DR3. A normal direction of each of the front and rear surfaces may be parallel to the third direction DR3.

A spaced distance between the front and rear surfaces in the third direction DR3 may correspond to a thickness/height of the electronic apparatus ELD in the third direction DR3. The directions indicated as the first to third directions DR1, DR2, and DR3 may be a relative concept and thus changed into different directions.

The electronic apparatus EA may sense an external input applied from an outside. The external input may include various types of inputs provided from the outside of the electronic apparatus EA.

In one embodiment, for example, the external input may include an external input (for example, hovering) applied to be proximity to or adjacent by a predetermined distance to the electronic apparatus EA as well as to contact a portion of the human body such as a user's hand. In an embodiment, the external input may include various types such as force, a pressure, a temperature, light, and the like.

FIG. 1A illustrates an embodiment where an external input is provided through a user's pen SP, for example. Although not shown, the pen SP may be mounted or detached inside or outside the electronic apparatus EA, and the electronic apparatus EA may provide and receive signals corresponding to the mounting and detachment of the pen SP.

In such an embodiment, the electronic apparatus EA may include a first display surface FS and a second display surface RS. The first display surface FS may include a first active area F-AA, a first peripheral area F-NAA, and an electronic module area EMA. The second display surface RS may be defined as a surface opposite to at least a portion of the first display surface FS.

The first active area F-AA may be an area that is activated according to an electrical signal. The first active area F-AA is an area on which an image IM is displayed, and various types of external inputs are sensed. The first peripheral area F-NAA is adjacent to the first active area F-AA. The first peripheral area F-NAA may have a predetermined color. The first peripheral area F-NAA may surround the first active area F-AA. Accordingly, a shape of the first active area F-AA may be substantially defined by the first peripheral area F-NAA. However, embodiments of the invention are not limited thereto, and alternatively, the first peripheral area F-NAA may be disposed adjacent to only one side of the first active area F-AA or may be omitted.

Various electronic modules may be disposed on the electronic module area EMA. In one embodiment, for example, the electronic module may include at least one selected from a camera, a speaker, an optical sensing sensor, and a thermal sensing sensor. The electronic module area EMA may sense an external subject received through the display surfaces FS and RS or provide a sound signal such as voice to the outside through the display surfaces FS and RS. The electronic module may include a plurality of constituents, but is not limited to a specific embodiment.

The electronic module area EMA may be surrounded by the first active area F-AA and the first peripheral area F-NAA. However, embodiments of the invention are not limited thereto. In one embodiment, for example, the electronic module area EMA may be disposed on the first active area F-AA, but is not limited to a specific embodiment.

In an embodiment, the electronic apparatus EA may include at least one folding area FA and a plurality of non-folding areas NFA1 and NFA2 extending from the folding area FA. The non-folding areas NFA1 and NFA2 may be disposed to be spaced apart from each other with the folding area FA therebetween. The non-folding areas NFA1 and NFA2 may be non-foldable and flat areas.

Referring to FIG. 1B, an embodiment of the electronic apparatus EA includes an imaginary first folding axis AX1 extending in the second direction DR2. The first folding axis AX1 may extend along the second direction DR2 on the first display surface FS. In such an embodiment, the non-folding areas NFA1 and NFA2 may extend from the folding area FA with the folding area FA therebetween. In one embodiment, for example, the first non-folding area NFA1 may extend along one side of the folding area FA extending in the second direction DR2, and the second non-folding area NFA2 may extend along the other side of the folding area FA extending in the second direction DR2.

The electronic apparatus EA may be folded with respect to the first folding axis AX1 (hereinafter, referred to as a folding axis) and thus be deformed in an in-folded state in which one area of the first display surface FS, which overlaps the first non-folding area NFA1, and the other area of the first display surface FS, which overlaps the second non-folding area NFA2, face each other.

Referring to FIG. 1C, in an embodiment of the electronic apparatus EA, the second display surface RS may be visually recognized by the user in the in-folded state. Here, the second display surface RS may include a second active area R-AA for displaying an image. The second active area R-AA may be an area activated according to an electrical signal. The second active area R-AA is an area on which an image is displayed, and various types of external inputs are sensed.

The second peripheral area R-NAA is adjacent to the second active area R-AA. The second peripheral area R-NAA may have a predetermined color. The second peripheral area R-NAA may surround the second active area R-AA. In an embodiment, although not shown, the second display surface RS may further include an electronic module area on which the electronic modules including various constituents are disposed, but is not limited to a specific embodiment.

Referring to FIG. 1D, an embodiment of the electronic apparatus EA includes an imaginary second folding axis AX2 extending in the second direction DR2. The second folding axis AX2 may extend along the second direction DR2 on the second display surface RS.

The electronic apparatus EA may be folded with respect to the second folding axis AX2 and thus be deformed in an out-folding state in which one area of the second display surface RS, which overlaps the first non-folding area NFA1, and the other area of the first display surface FS, which overlaps the second non-folding area NFA2, face each other.

However, the embodiments of the invention are not limited thereto. In one embodiment, for example, the electronic apparatus EA may be folded with respect to a plurality of folding axes so that a portion of the first display surface FS and a portion of the second display surface RS face each other, and the number of folding axes and the number of non-folding areas corresponding to the number of folding axes are not limited to a specific embodiment.

Figure 2A:
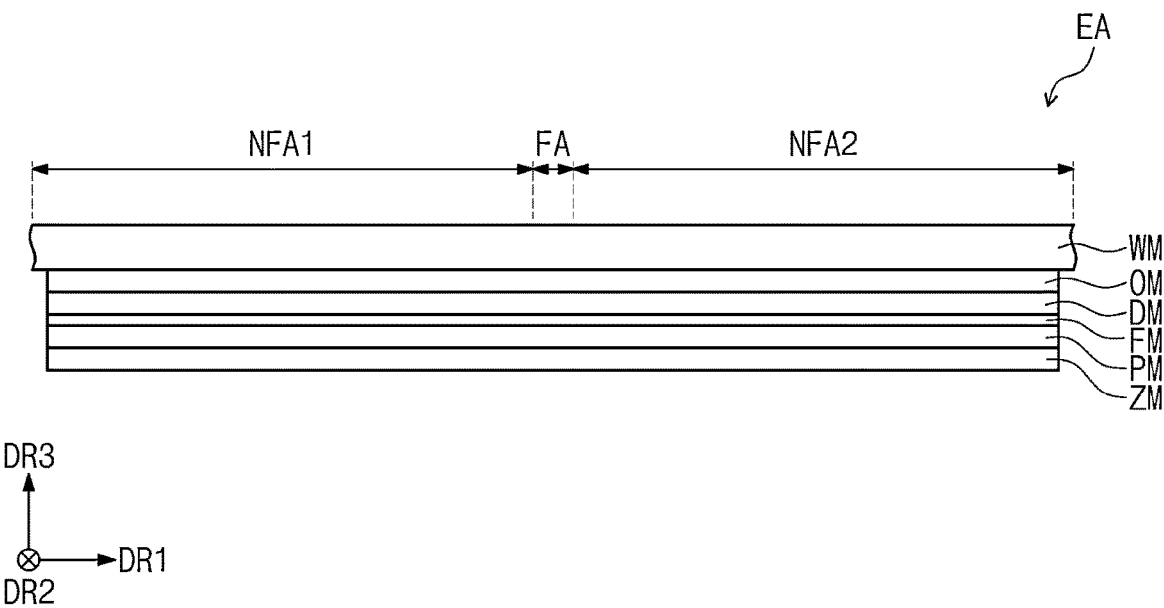
FIG. 2A is a cross-sectional view of an electronic apparatus according to an embodiment of the invention.
Figure 2B:
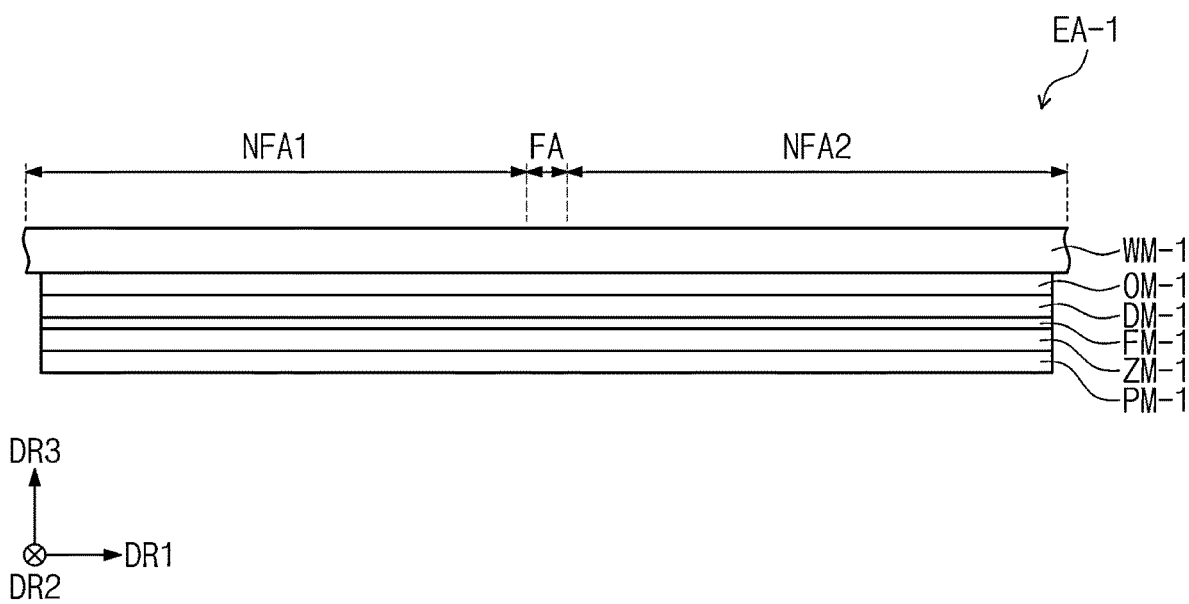
FIG. 2B is a cross-sectional view of an electronic apparatus according to an embodiment of the invention.
Figure 2C:
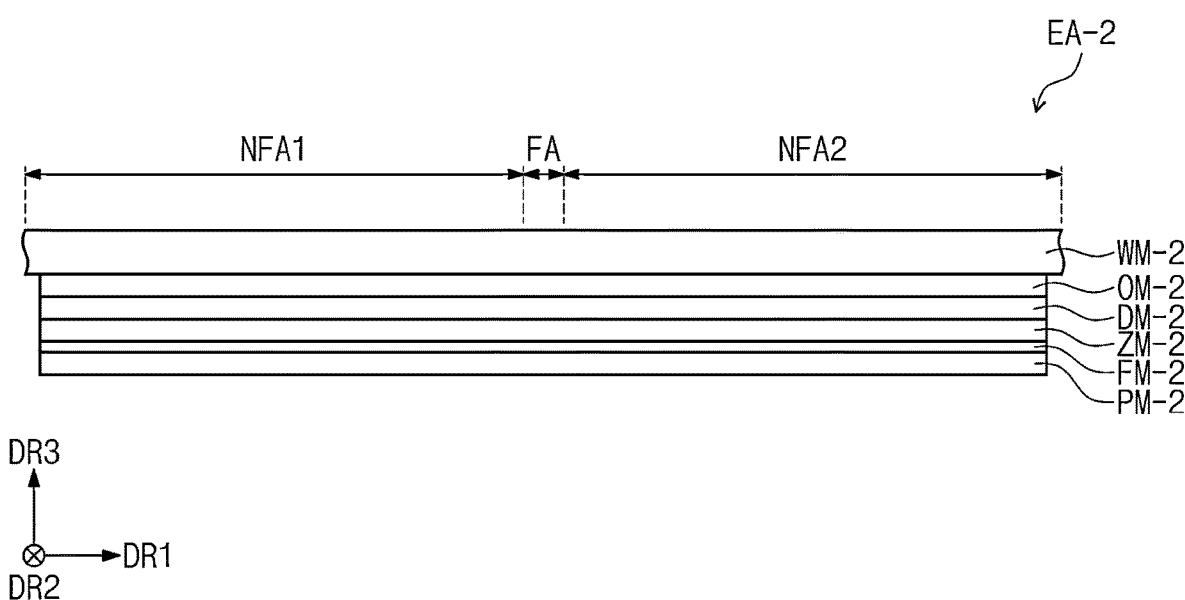
FIG. 2C is a cross-sectional view of an electronic apparatus according to an embodiment of the invention.

FIG. 2A is a cross-sectional view of an electronic apparatus according to an embodiment of the invention. FIG. 2B is a cross-sectional view of an electronic apparatus according to an embodiment of the invention. FIG. 2C is a cross-sectional view of an electronic apparatus according to an embodiment of the invention.

Referring to FIG. 2A, an embodiment of an electronic apparatus EA includes a window WM, an optical member OM, a display module DM, a lower film FM, a protection member PM, and a sensing sensor ZM.

The window WM is disposed on the display module DM. The window WM may be coupled to a housing to define an outer appearance of the electronic apparatus and may protect the display module DM.

The window WM may include a material having high light transmittance. In one embodiment, for example, the window WM may include a glass substrate, a sapphire substrate, or a plastic film. The window WM may have a single layer or multilayered structure. In one embodiment, for example, the window WM may have a laminated structure of a plurality of plastic films bonded to each other by using an adhesive or a laminated structure of a glass substrate and a plastic film, which are bonded to each other by using an adhesive. Although not shown, functional layers that protects the window WM may be further provided on the window WM. In one embodiment, for example, the functional layers may include at least one selected from an anti-fingerprint layer and an impact absorbing layer, and are not limited to a specific embodiment.

The optical member OM is disposed under the window WM. The optical member OM may reduce reflectance of external light of the display module DM with respect to light incident onto the display module DM. In one embodiment, for example, the optical member OM may include at least one selected from an antireflection film, a polarizing film, a color filter, and a gray filter.

The display module DM may function as an output device. In one embodiment, for example, the display module DM may display an image on the active areas F-AA and R-AA, and the user may acquire information through the image. In an embodiment, the display module DM may function as an input device that senses an external input applied to the active areas F-AA and R-AA.

The lower film FM is disposed under the display module DM. The lower film FM may reduce stress applied to the display module DM when the electronic apparatus EA is folded. In an embodiment, the lower film FM may prevent external moisture from being permeated into the display module DM and may absorb an external shock.

The lower film FM may include a plastic film as a base layer. The lower film FM may include a plastic film including at least one selected from polyethersulphone ("PES"), polyacrylate ("PAR"), polyetherimide ("PEI"), polyethylenennaphthalate ("PEN"), polyethyeleneterepthalate ("PET"), polyphenylene sulfide ("PPS"), polyallylate, polyimide ("PI"), polycarbonate ("PC"), poly(arylene ether-sulfone), and a combination thereof.

A material of the lower film FM is not limited to a plastic resin and thus may include an organic/inorganic composite material. The lower film FM may include a porous organic layer and an inorganic material that is filled into pores of the organic layer.

The lower film FM may further include a functional layer disposed or formed on the plastic film. The functional layer may include a resin layer. The functional layer may be formed in a coating manner.

The protection member PM is disposed under the display module DM. The protection member PM may include at least one functional layer for protecting the display module DM. In one embodiment, for example, the protection member PM may include a light blocking layer, a heat dissipation layer, a cushion layer, and a plurality of adhesive layers.

The light blocking layer may serve to improve exposure of components disposed on the display module DM by the window WM through the active areas F-AA and R-AA.

Although not shown, the light blocking layer may include a binder and a plurality of pigment particles dispersed in the binder. The pigment particles may include carbon black or the like. In such an embodiment, the electronic apparatus EA may have f improved light shielding property by including the protection member PM including the light blocking layer.

The heat dissipation layer may effectively dissipate heat generated from the display module DM. The heat dissipation layer may include at least one selected from graphite, copper (Cu) and aluminum (Al), which have high heat dissipation properties, but is not limited thereto. The heat dissipation layer may not only improve heat dissipation properties, but also have electromagnetic wave shielding or electromagnetic wave absorption properties.

The cushioning layer may be or include synthetic resin foam. The cushioning layer may include a matrix and a plurality of pores. The cushion layer may have elasticity and may have a porous structure.

The matrix may include a flexible material. The matrix includes a synthetic resin. In one embodiment, for example, the matrix may include at least one selected from an acrylonitrile butadiene styrene copolymer ("ABS"), polyurethane ("PU"), polyethylene ("PE"), ethylene vinyl acetate ("EVA"), and polyvinyl chloride ("PVC").

The pores may effectively absorb an impact applied to the cushion layer. The pores may be defined as the cushion layer having the porous structure.

However, embodiments of the invention are not limited thereto, and at least one selected from the light blocking layer, the heat dissipation layer, and the cushion layer may be omitted, and a plurality of layers may be provided as a single layer, but is not limited to a specific embodiment.

The sensing sensor ZM is disposed under the display module DM. The sensing sensor ZM may sense a signal transmitted by the pen SP (see FIG. 1A) among external inputs. The sensing sensor ZM may sense an external input in an electromagnetic resonance manner. In the electromagnetic resonance manner, a magnetic field may be generated in a resonant circuit provided inside the pen SP, and the vibrating magnetic field may induce a signal to a plurality of coils included in the sensing sensor ZM to sense a position of the pan SP through the signal induced to the coils. The sensing sensor ZM will be described later in greater detail.

In an embodiment, the electronic apparatus EA may have a structure in which the sensing sensor ZM, the protection member PM, the lower film FM, the display module DM, the optical member OM, and the window WM are sequentially laminated in the third direction DR3.

Although not shown, the components included in the electronic apparatus EA may be bonded to each other by an adhesive layer disposed between the components. In an embodiment, the adhesive layer may be an optically clear adhesive film ("OCA)", an optically clear resin ("OCR"), or a pressure sensitive adhesive film ("PSA"). In an embodiment, the adhesion layer may include a photocurable adhesive material or a thermosetting adhesive material, but is not specifically limited thereto.

Referring to FIG. 2B, in an alternative embodiment, an electronic apparatus EA-1 includes a window WM-1, an optical member OM-1, a display module DM-1, a lower film FM-1, a sensing sensor ZM-1, and a protection member PM-1. Components included in the electronic apparatus EA-1 of FIG. 2B may have the same configurations as those included in the electronic apparatus EA described above with reference to FIG. 2A except for a stacking order, and thus, any repetitive detailed description thereof will be omitted or simplified.

In such an embodiment, as shown in FIG. 2B, the electronic apparatus EA-1 may have a structure in which the protection member PM-1, the sensing sensor ZM-1, the lower film FM-1, the display module DM-1, the optical member OM-1, and the window WM-1 are sequentially laminated in the third direction DR3.

Referring to FIG. 2C, in another alternative embodiment, an electronic apparatus EA-2 includes a window WM-2, an optical member OM-2, a display module DM-2, a sensing sensor ZM-2, a lower film FM-2, and a protection member PM-2. Components included in the electronic apparatus EA-2 of FIG. 2C may have the same configurations as those included in the electronic apparatus EA described in FIG. 2A except for a stacking order, and thus, any repetitive detailed description thereof will be omitted or simplified.

In such an embodiment, as shown in FIG. 2C, the electronic apparatus EA-2 may have a structure in which the protection member PM-2, the lower film FM-2, the sensing sensor ZM-2, the display module DM-2, the optical member OM-2, and the window WM-2 are sequentially laminated in the third direction DR3.

Figure 3A:
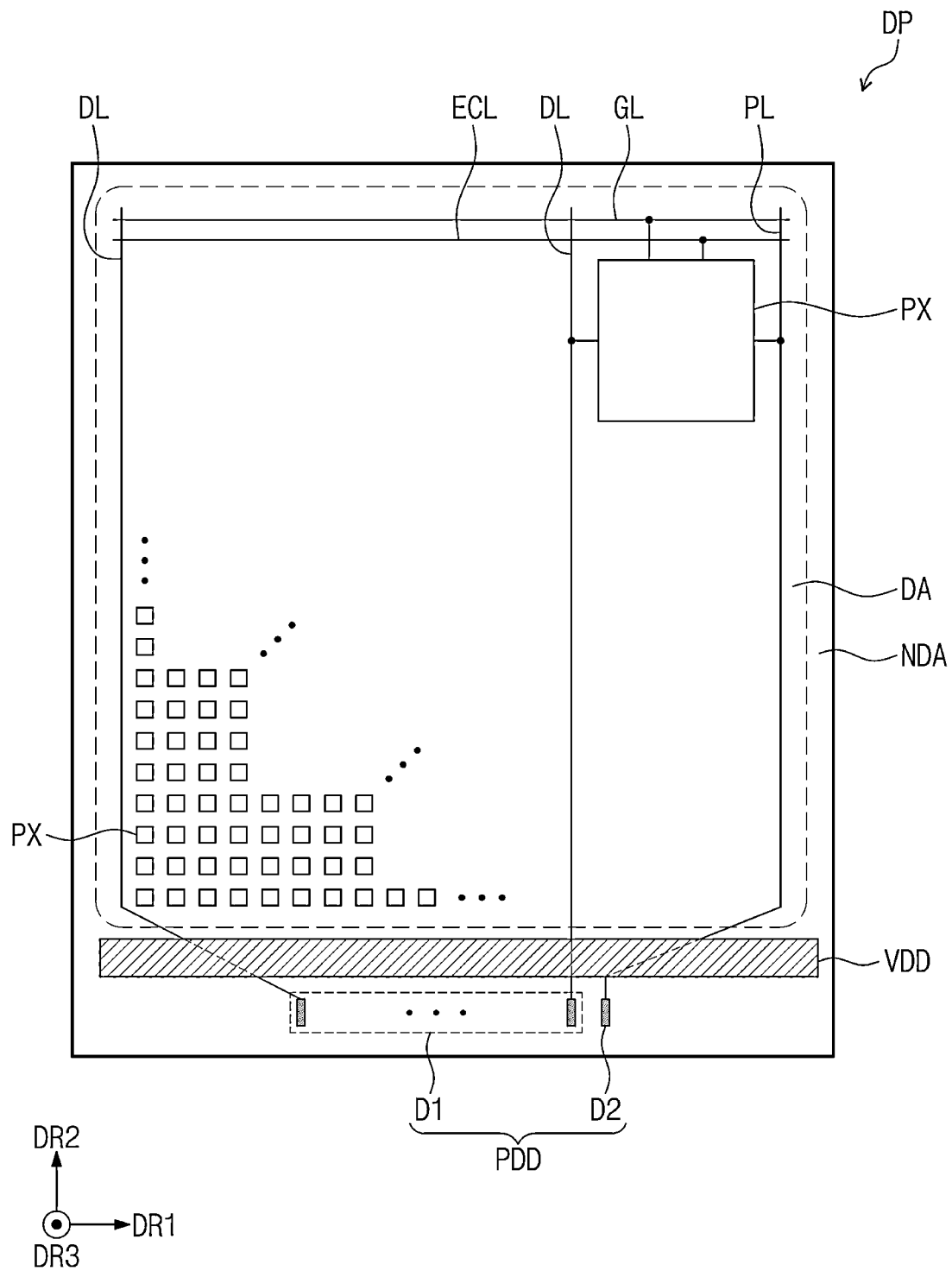
FIG. 3A is a plan view of a display panel according to an embodiment of the invention.
Figure 3B:
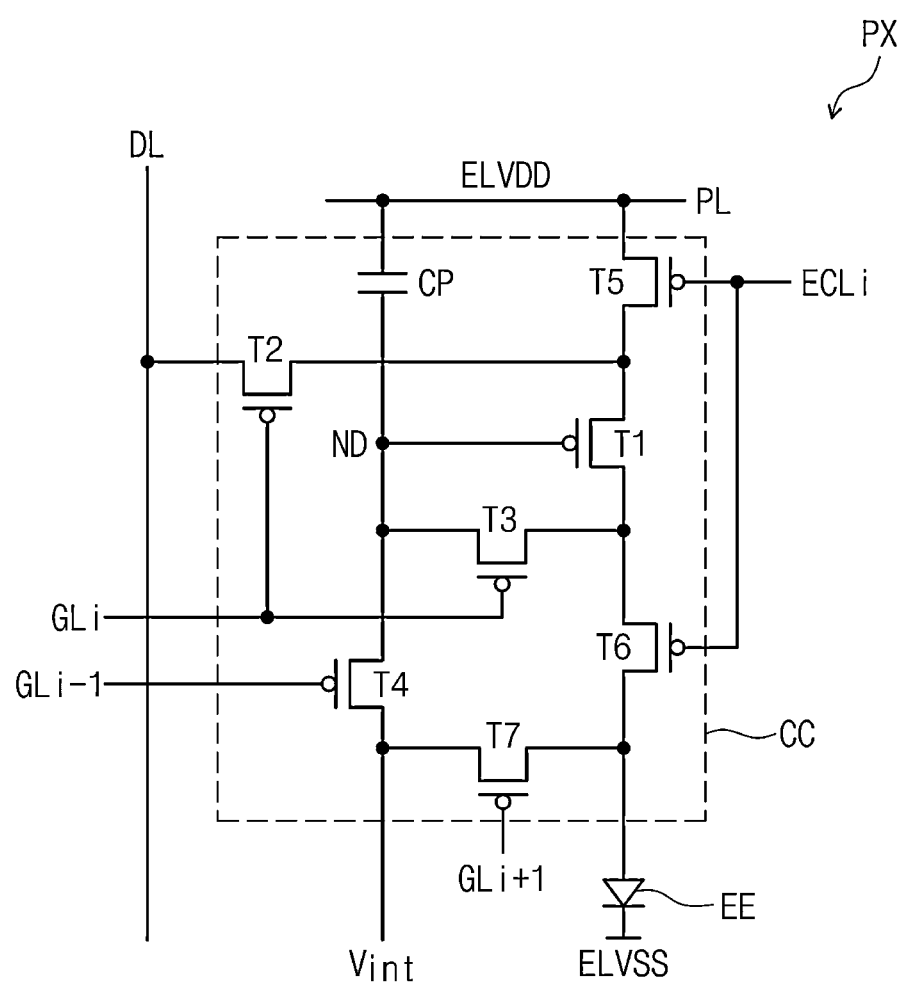
FIG. 3B is an equivalent circuit diagram of a pixel according to an embodiment of the invention.
Figure 4:
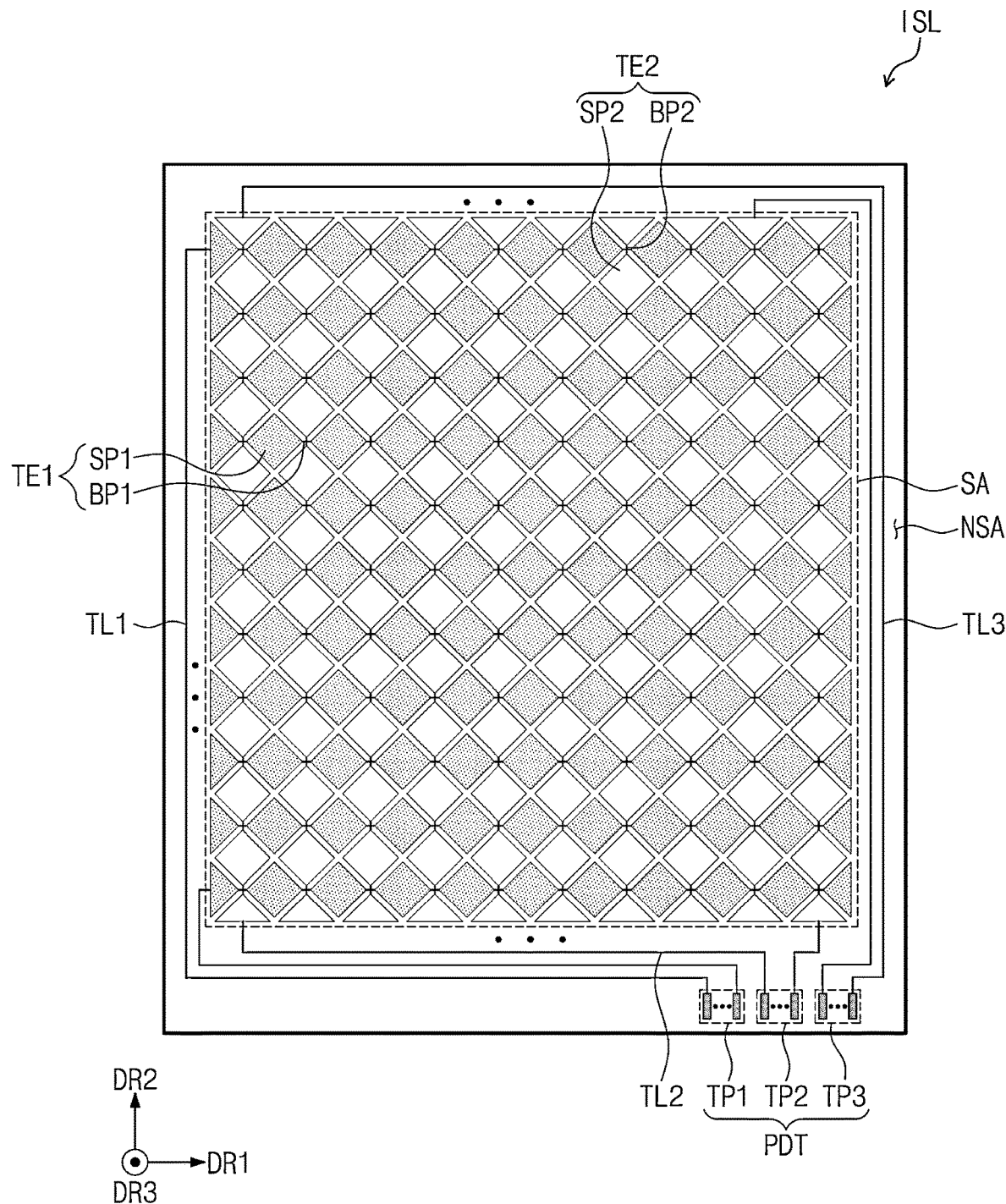
FIG. 4 is a plan view of an input sensing panel according to an embodiment of the invention.

FIG. 3A is a plan view of a display panel according to an embodiment of the invention. FIG. 3B is an equivalent circuit diagram of a pixel according to an embodiment of the invention. FIG. 4 is a plan view of an input sensing panel according to an embodiment of the invention. The same or like reference numerals are used to describe the same or like elements as those described above with reference to FIGS. 1A to 2C, and any repetitive detailed descriptions thereof will be omitted or simplified. Embodiments of the display module DM, DM-1, and DM-2 described above with reference to FIGS. 2A to 2C may include a display panel (or a display layer) DP and an input sensing panel (or a sensor layer) ISL.

Referring to FIG. 3A, the display panel (hereinafter, will be referred to as "display layer") DP may include a plurality of pixels PX, a plurality of signal lines GL, DL, PL, and ECL, and a plurality of display pads PDD.

A display area DA of the display layer DP may be an area on which an image IM is displayed, and a non-display area NDA may be an area on which a driving circuit or a driving line is disposed. In an embodiment, the display area DA may overlap at least a portion of the active areas F-AA and R-AA of the electronic apparatus EA. In such an embodiment, the non-display area NDA may overlap peripheral areas F-NAA and R-NAA of the electronic apparatus EA.

The signal lines GL, DL, PL, and ECL are connected to the pixels PX to transmit electrical signals to the pixels PX. In one embodiment, for example, the signal lines GL, DL, PL and ECL in the display layer DP may include a scan line GL, a data line DL, a power line PL, and an emission control line EL, as shown in FIG. 3A, but not being limited thereto. In one alternative embodiment, for example, the signal lines GL, DL, PL, and ECL may further include an initialization voltage line, but is not limited to a specific embodiment.

The pixels PX may be arranged to be spaced apart from each other along the first direction DR1 and the second direction DR2 and thus may be arranged in a matrix form in a plan view.

In FIG. 3B, a signal circuit diagram of an embodiment of a pixel PX of the pixels is illustrated. FIG. 3B illustrates an embodiment of a pixel PX connected to an i-th scan line GLi and an i-th emission control line ECLi.

The pixel PX may include a light emitting element EE and a pixel circuit CC. The pixel circuit CC may include a plurality of transistors T1 to T7 and a capacitor CP. In an embodiment, the transistors T1 to T7 may be formed through a low temperature polycrystalline silicon ("LTPS") process or a low temperature polycrystalline oxide ("LTPO") process.

In an embodiment, the pixel circuit CC may control an amount of current flowing in the light emitting element EE in response to a data signal. The light emitting element EE may emit light having predetermined luminance corresponding to an amount of current supplied from the pixel circuit CC. In such an embodiment, a first power voltage ELVDD may be set to a level higher than that of a second power voltage ELVSS. The light emitting element EE may include an organic light emitting element or a quantum dot light emitting element.

Each of the transistors T1 to T7 may include an input electrode (or a source electrode), an output electrode (or a drain electrode), and a control electrode (or a gate electrode). Here, for convenience of description, one of the input electrode and the output electrode may be referred to as a first electrode and the other of the input electrode and the output electrode may be referred to as a second electrode.

The first electrode of the first transistor T1 is connected to the power line PL (or the first power voltage ELVDD) via the fifth transistor T5, and the second electrode of the first transistor T1 is connected to an anode electrode of the light emitting element EE via the sixth transistor T6. The first transistor T1 may be referred to as a driving transistor.

The first transistor T1 may control an amount of current flowing in the light emitting element EE based on a voltage applied to the control electrode of the first transistor T1.

The second transistor T2 is connected between the data lien DL and the first electrode of the first transistor T1. Also, the control electrode of the second transistor T2 is connected to the i-th scan line GLi. When an i-th scan signal is applied to the i-th scan line GLi, the second transistor T2 may be turned on to electrically connect the data line DL to the first electrode of the first transistor T1.

The third transistor T3 is connected between the second electrode of the first transistor T1 and the control electrode of the first transistor T1. The control electrode of the third transistor T3 is connected to the i-th scan line GLi. When the i-th scan signal is provided to the i-th scan line GLi, the third transistor T3 is turned on to electrically connect the second electrode of the first transistor T1 to the control electrode of the first transistor T1. Thus, when the third transistor T3 is turned on, the first transistor T1 is connected in the form of a diode.

The fourth transistor T4 is connected between a node ND and an initialization power generation unit (not shown). Also, the control electrode of the fourth transistor T4 is connected to an (i−1)-th scan line GLi−1. When an (i−1)-th scan signal is provided to the (i−1)-th scan line GLi−1, the fourth transistor T4 is turned on to provide an initialization voltage Vint to the node ND.

The fifth transistor T5 is connected between the power line PL and the first electrode of the first transistor T1. The control electrode of the fifth transistor T5 is connected to an i-th emission control line ECLi.

The sixth transistor T6 is connected between the second electrode of the first transistor T1 and the anode electrode of the light emitting element EE. Also, the control electrode of the sixth transistor T6 is connected to the i-th emission control line ECLi.

The seventh transistor T7 is connected between the initialization voltage Vint and the anode electrode of the light emitting element EE. Also, the control electrode of the seventh transistor T7 is connected to an (i+1)-th scan line GLi+1. When the (i+1)-th scan signal is provided to the (i+1)-th scan line GLi+1, the seventh transistor T7 is turned on to provide the initialization voltage Vint to the anode electrode of the light emitting element EE.

In an embodiment, the seventh transistor T7 may improve black display capability of the pixel PX. In such an embodiment, when the seventh transistor T7 is turned on, a parasitic capacitor (not shown) of the light emitting element EE is discharged. Thus, when black luminance is implemented, the light emitting element EE may not emit light corresponding to the black luminance due to leakage current from the first transistor T1, and thus, the black display performance may be improved.

In an embodiment, the control electrode of the seventh transistor T7 may be connected to the (i+1)-th scan line GLi+1 as shown in FIG. 3B, but embodiments of the invention are not limited thereto. In an alternative embodiment of the invention, the control electrode of the seventh transistor T7 may be connected to the i-th scan line GLi or the (i−1)-th scan line GLi−1.

The capacitor CP is connected between the power line PL and the node ND. The capacitor CP stores a voltage corresponding to the data signal. When the fifth transistor T5 and the sixth transistor T6 are turned on in response to the voltage stored in the capacitor CP, an amount of current flowing through the first transistor T1 may be determined.

In embodiments of the invention, an equivalent circuit of the pixel PX is not limited to the equivalent of FIG. 3B. According to an alternative embodiment of the invention, the pixel may be variously modified to allow the light emitting element EE to emit light. In an embodiment, as shown in FIG. 3B, the pixel circuit CC includes P-type transistors, e.g., P-channel metal-oxide-semiconductor ("PMOS") transistors, but embodiments of the invention are not limited thereto. In an alternative embodiment of the invention, the pixel circuit CC may include N-type transistors, e.g., N-channel metal-oxide-semiconductor ("NMOS") transistors. In another alternative embodiment of the invention, the pixel circuit CC may be constituted by a combination of NMO and PMOS transistors.

Referring back to FIG. 3A, in an embodiment, a power pattern VDD is disposed on the non-display area NDA. In such an embodiment, the power pattern VDD is connected to the power lines PL. Thus, since the display layer DP may include the power pattern VDD, a same first power signal (or a constant first power voltage) may be provided to the pixels.

The display pads PDD may include a first pad D1 and a second pad D2. The first pad D1 may be provided in plural, and the first pads D1 may be connected to the data lines DL, respectively. The second pad D2 may be connected to the power pattern VDD and electrically connected to the power line PL. The display layer DP may provide electrical signals provided from the outside to the pixels PX through the display pads PDD. The display pads PDD may further include pads for receiving other electrical signals in addition to the first pad D1 and the second pad D2, but are not limited to a specific embodiment.

Referring to FIG. 4, the input sensing panel (hereinafter, will be referred to as "sensor layer") ISL may be disposed on the display layer DP. The sensor layer ISL may be bonded to the display layer DP through a separate adhesive layer. However, embodiments of the invention are not limited thereto, and alternatively, the sensor layer ISL may be disposed directly on the display layer DP by a continuous process, but is not limited to a specific embodiment.

The sensor layer ISL may include a first sensing electrode TE1, a second sensing electrode TE2, a plurality of trace lines TL1, TL2, and TL3, and a plurality of sensing pads PDT. A sensing area SA and a non-sensing area NSA may be defined in the sensor layer ISL. The non-sensing area NSA may surround the sensing area SA. The sensing area SA may be a sensing area that senses an input applied from the outside. The sensing area SA may overlap the display area DA of the display layer DP.

The sensor layer ISL may sense an external input in any one manner of a self-capacitance type and a mutual capacitance type. The first sensing electrode TE1 and the second sensing electrode TE2 may be variously deformed to be disposed and connected according to the above-described manners.

The first sensing electrodes TE1 may include first sensing patterns SP1 and first bridge patterns BP1. The first sensing electrode TE1 may extend in the first direction DR1 and be arranged in the second direction DR2. The first sensing patterns SP1 may be arranged to be spaced apart from each other in the first direction Dr1. At least one first connection pattern BP1 may be disposed between two first sensing patterns SP1 adjacent to each other.

The second sensing electrode TE2 may include second sensing patterns SP2 and second bridge patterns BP2. The second sensing electrode TE2 may extend in the second direction DR2 and be arranged in the first direction DR1. The second sensing electrodes TE2 may be and arranged to be spaced apart from each other in the second direction DR2. At least one second connection pattern BP2 may be disposed between two second sensing patterns SP2 adjacent to each other.

The trace lines TL1, TL2, and TL3 are disposed on the non-sensing area NSA. The trace lines TL1, TL2, and TL3 may include a first trace line TL1, a trace sensing line TL2, and a third trace line TL3.

The first trace line TL1 is connected to one end of the first sensing electrode TEL The second trace line TL2 is connected to one end of the second sensing electrode TE2. The third trace line TL3 is connected to the other end of the second sensing electrode TE2. The other end of the second sensing electrode TE2 may be a portion opposite to one end of the second sensing electrode TE2.

According to an embodiment of the invention, the second sensing electrode TE2 may be connected to the second trace line TL2 and the third trace line TL3. Thus, in such an embodiment, sensitivity on the area with respect to the second sensing electrode TE2, which has a length that is relatively longer than that of the first sensing electrode TE1, may be uniformly maintained, but not being limited thereto. In one alternative embodiment, for example, the third trace line TL3 may be omitted, but is not limited to a specific embodiment.

The sensing pads PDT are disposed in the non-sensing area NSA. The sensing pads PDT may include a first sensing pad TP1, a second sensing pad TP2, and a third sensing pad TP3. The first sensing pad TP1 is connected to the first trace line TL1 and electrically connected to the first sensing electrode TEL The second sensing pad TP2 is connected to the second trace line TL2, and the third sensing pad TP3 is connected to the third trace line TL3. Therefore, the second sensing pad TP2 and the third sensing pad TP3 are electrically connected to the corresponding second sensing electrode TE2.

Figure 5:
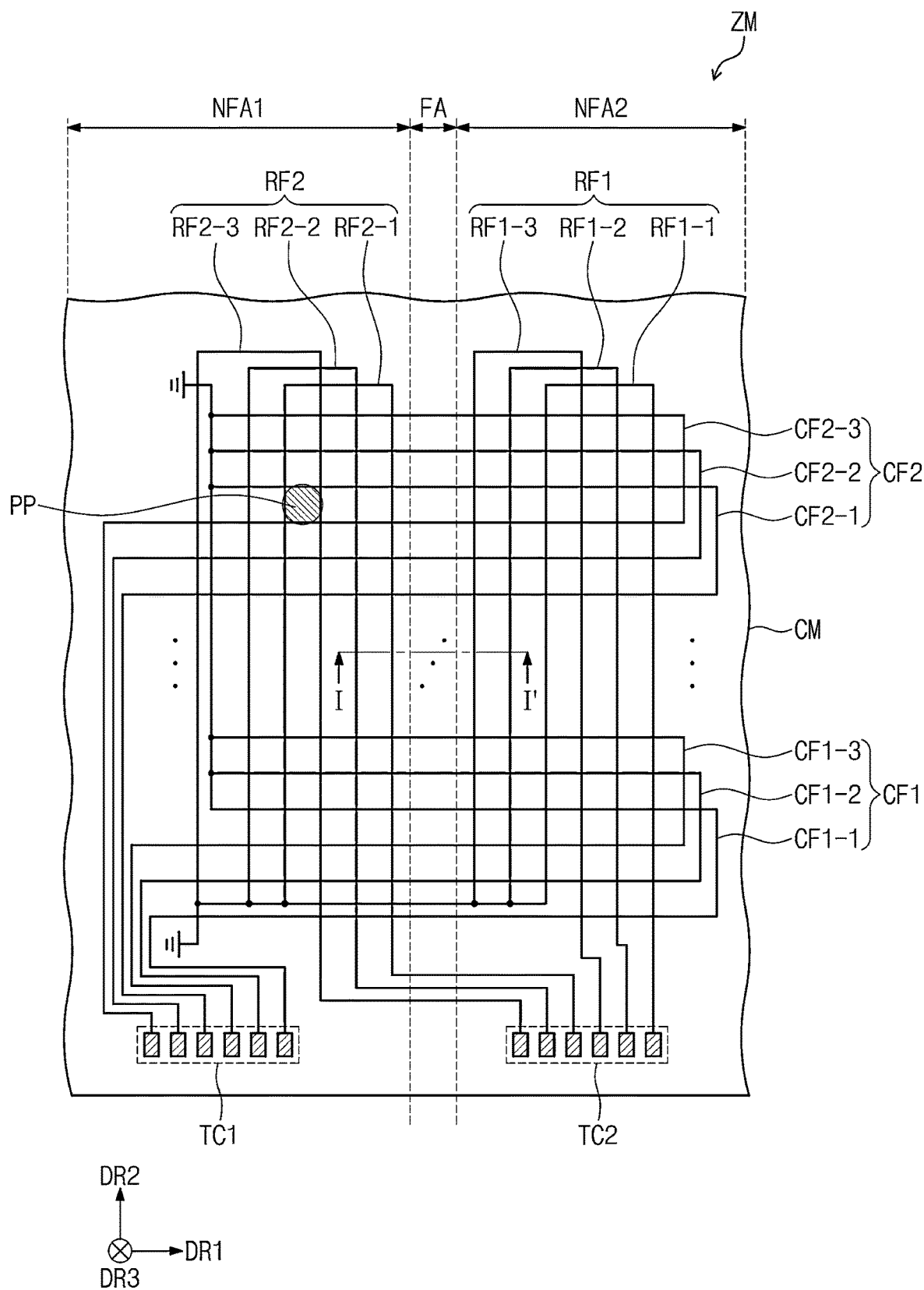
FIG. 5 is a plan view of a sensing sensor according to an embodiment of the invention.
Figure 6:
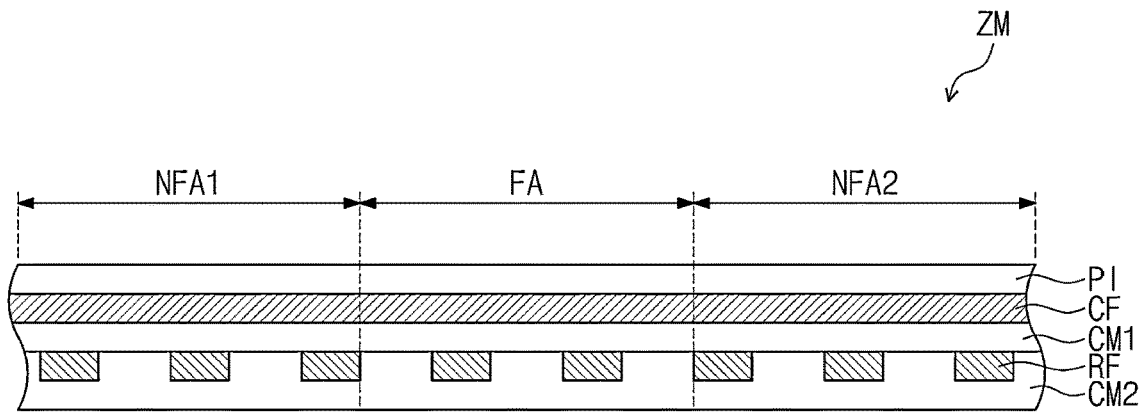
FIG. 6 is a cross-sectional view taken along line I-I' of FIG. 5.

FIG. 5 is a plan view of the sensing sensor according to an embodiment of the invention. FIG. 6 is a cross-sectional view taken along line I-I' of FIG. 5.

Referring to FIG. 5, in an embodiment, the sensing sensor ZM may sense an external input in the electromagnetic resonance (manner. The sensing sensor ZM may include a base layer PI (shown in FIG. 6), a plurality of sensing part sensors CF1, CF2, RF1, and RF2, and a plurality of sensing sensor pads TC1 and TC2. In an embodiment of the invention, a cover layer CM may be disposed between the first sensing part sensors CF1 and CF2 and the second sensing part sensors RF1 and RF2, which receive signals different from each other.

The first sensing part sensors CF1 and CF2 include a plurality of first sensing coils CF1-1, CF1-2, CF1-3, CF2-1, CF2-2, and CF2-3, and the second sensing sensors RF1 and RF2 include a plurality of second sensing coils RF1-1, RF1-2, RF1-3, RF2-1, RF2-2, and RF2-3.

The first sensing coils CF1-1, CF1-2, CF1-3, CF2-1, CF2-2, and CF2-3 may have a coil shape connected to each other. In one embodiment, for example, each of the first sensing coils CF1-1, CF1-2, CF1-3, CF2-1, CF2-2, and CF2-3 may include first long sides, which extend in the first direction DR1 and are spaced apart from each other in the second direction DR2, and a first short side extending in the second direction DR2. The first short side may be disposed between the first long sides to connect the first long sides to each other. In an embodiment, the first long sides of the first sensing coils CF1-1, CF1-2, CF1-3, CF2-1, CF2-2, and CF2-3 may pass through the folding area FA, and the first short side may be disposed at a right side of the second non-folding area NFA2 and connected to ends of each the first long sides.

The second sensing coils RF1-1, RF1-2, RF1-3, RF2-1, RF2-2, and RF2-3 may have a coil shape connected to each other. In one embodiment, for example, each of the second sensing coils RF1-1, RF1-2, RF1-3, RF2-1, RF2-2, and RF2-3 may include second long sides, which extend in the second direction DR2 and are spaced apart from each other in the first direction DR1, and a second short side extending in the first direction DR1. The second short side may be disposed between the second long sides to connect the second long sides to each other. In this embodiment, the second long sides of each of the second sensing coils RF1-1, RF1-2, RF1-3, RF2-1, RF2-2, and RF2-3 may not overlap the folding area FA, and the second short side may be disposed above each of the non-folding regions NFA1 and NHA2 and connected to ends of each of the second long sides.

The first sensing part sensors CF1 and CF2 correspond to input coils of the electromagnetic resonance-type sensing sensor ZM, and the second sensing part sensors RF1 and RF2 correspond to output coils of the electromagnetic resonance-type sensing sensor ZM.

The first sensing coils CF1-1, CF1-2, CF1-3, CF2-1, CF2-2, and CF2-3 and the second sensing coils RF1-1, RF1-2, RF1-3, RF2-1, RF2-2, and RF2-3 may be insulated from each other via the cover layer CM. Each of the first sensing coils CF1-1, CF1-2, CF1-3, CF2-1, CF2-2, and CF2-3 is connected to the corresponding first sensing sensor pads TC1, and each of the second sensing coils RF1-1, RF1-2, RF1-3, RF2-1, RF2-2, and RF2-3 is connected to the corresponding second sensing sensor pads TC2.

Although not shown, a flexible circuit board connected to the sensing sensor pads TC1 and TC2 and a main circuit board connected to the flexible circuit board to drive the sensing sensor ZM may be provided.

Each of the first sensing coils CF1-1, CF1-2, CF1-3, CF2-1, CF2-2, and CF2-3 receives scan signals activated in different sections. Each of the first sensing coils CF1-1, CF1-2, CF1-3, CF2-1, CF2-2, and CF2-3 generates a magnetic field in response to the corresponding scan signal.

When the pen SP (see FIG. 1A) is adjacent to the first sensing coils CF1-1, CF1-2, CF1-3, CF2-1, CF2-2, and CF2-3, the magnetic field induced from the first sensing coils CF1-1, CF1-2, CF1-3, CF2-1, CF2-2, and CF2-3 resonates with the resonant circuit of the pen SP, and the pen SP generates a resonant frequency. Here, the pen SP may be a pen having an LC resonant circuit including an inductor and a capacitor.

The second sensing coils RF1-1, RF1-2, RF1-3, RF2-1, RF2-2, and RF2-3 output sensing signals corresponding to the resonant frequency of the input unit to the second sensing sensor pads TC2.

A central portion, on an area on which a second coil CF2-2 of the first sensing coils CF1-1, CF1-2, CF1-3, CF2-1, CF2-2, and CF2-3, and a second coil RF2-2 of the second sensing coils RF1-1, RF1-2, RF1-3, RF2-1, RF2-2, and RF2-3 cross each other, may defined an input point PP.

The sensing signal output from the second coil CF2-2 of the first sensing coils CF1-1, CF1-2, CF1-3, CF2-1, CF2-2, and CF2-3 has a level higher than that of each of the sensing signals output from the remaining first sensing coils CF1-1, CF1-2, CF1-3, CF2-1, and CF2-3.

The sensing signal output from the second coil RF2-2 of the second sensing coils RF1-1, RF1-2, RF1-3, RF2-1, RF2-2, and RF2-3 has a level higher than that of each of the sensing signals output from the remaining second sensing coils RF1-1, RF1-2, RF1-3, RF2-1, and RF2-3.

Each of the sensing signals output from a first coil RF2-1 and a third coil RF2-3 of the second sensing coils RF1-1, RF1-2, RF1-3, RF2-1, RF2-2, and RF2-3 has a level lower than that of the sensing signal output from the second coil RF2-2, and each of the sensing signals output from the first coil RF2-1 and the third coil RF2-3 of the second sensing coils RF1-1, RF1-2, RF1-3, RF2-1, RF2-2, and RF2-3 has a level lower than that of each of the sensing signals output from the remaining second sensing coils RF1-1, RF1-2, and RF1-3.

Two dimensional ("2D") coordinate information of the input point PP by the pen SP may be calculated based on a time at which the sensing signal output from the second coil RF2-2, which has a high level, and a relative position of the second coil RF2-2 with respect to the second sensing coils RF1-1, RF1-2, RF1-3, and RF2.

In an embodiment, some of the sensing coils CF1-1, CF1-2, CF1-3, CF2-1, CF2-3, RF1-1, RF1-2, RF1-3, RF2-1, and RF2-3 may be partially omitted on the area overlapping the folding area FA and spaced apart from the folding area FA, but is not limited to a specific embodiment.

Referring to FIG. 6, an embodiment of the sensing sensor ZM may include a base layer PI, first sensing coils CF, a first cover layer CM1, second sensing coils RF, and a second cover layer CM2.

In FIG. 6, the first sensing coils CF of the sensing sensor ZM may correspond to one of the first sensing coils CF1-1, CF1-2, CF1-3, CF2-1, CF2-2, and CF2-3, and the second sensing coils RF may correspond to one of the second sensing coils RF1-1, RF1-2, RF1-3, RF2-1, RF2-2, RF2-3.

In embodiments of the disclosure, a lamination order in the sensing sensor will be described as a lamination order according to a method for manufacturing the sensing sensor. In FIG. 6, the base layer PI may be disposed "on" the first sensing coils CF based on the thickness direction DR3 of the electronic apparatus EA, but the first sensing coils CF may be described as being disposed on the base layer RI and covered by the first cover layer CM1 according to the order in the method for manufacturing the sensing sensor.

The base layer PI may include an organic material. In one embodiment, for example, the base layer BL may include PI. The first sensing coils CF are disposed on the base layer PI.

The first cover layer CM1 may be disposed on the base layer PI to cover the first sensing coils CF. In an embodiment, the first cover layer CM1 may include a material that is more flexible (or having a higher flexibility) than the base layer PI. In an embodiment, the cover layer CM1 may include synthetic rubber and an elastic rubber including a crosslinking component. In one embodiment, for example, the synthetic rubber may include at least one selected from butadiene rubber, styrene-butadiene rubber, and butyl rubber. The second sensing coils RF may be disposed on the first cover layer CM1.

The second cover layer CM2 may be disposed on the first cover layer CM1 to cover the second sensing coils RF. The second cover layer CM2 may include a same material as the first cover layer CM1 or may include a material having a modulus less than the first cover layer CM1.

In an embodiment of the invention, the first cover layer CM1 may have a modulus less than that of the base layer PI. The modulus of the first cover layer CM1 may be in a range of about 10 megapascal (MPa) to about 100 MPa. If the modulus of the first cover layer CM1 is less than about 10 MPa, the second sensing coils RF may be disconnected while patterning the second sensing coils RF on the first cover layer CM1. If the modulus of the first cover layer CM1 is greater than about 100 MPa, cracks may occur in a portion of the first cover layer CM1 overlapping the folding area FA of the sensing sensor ZM due to stress applied during folding.

A yield point of the first cover layer CM1 may be about 5% or more, and after the first cover layer CM1 is elongated by about 3%, a recovery rate may be about 90% or more.

When the electronic apparatus ED is in-folded as illustrated in FIGS. 1B and 2A, the sensing sensor ZM disposed at the outermost side with respect to the folding axis AX1 may receive stress.

According to an embodiment of the invention, when the electronic apparatus ED is in-folded, the first cover layer CM1 disposed at the relatively outside portion with respect to the folding axis AX1 may include a modulus less than that of the base layer PI to reduce stress applied to the sensing sensor ZM. Therefore, cracks may be effectively prevented from occurring in a portion of the first cover layer CM1 overlapping the folding area FA of the sensing sensor ZM, and thus, the electronic apparatus EA including the sensing sensor ZM having improved folding characteristics may be provided.

Figure 7:
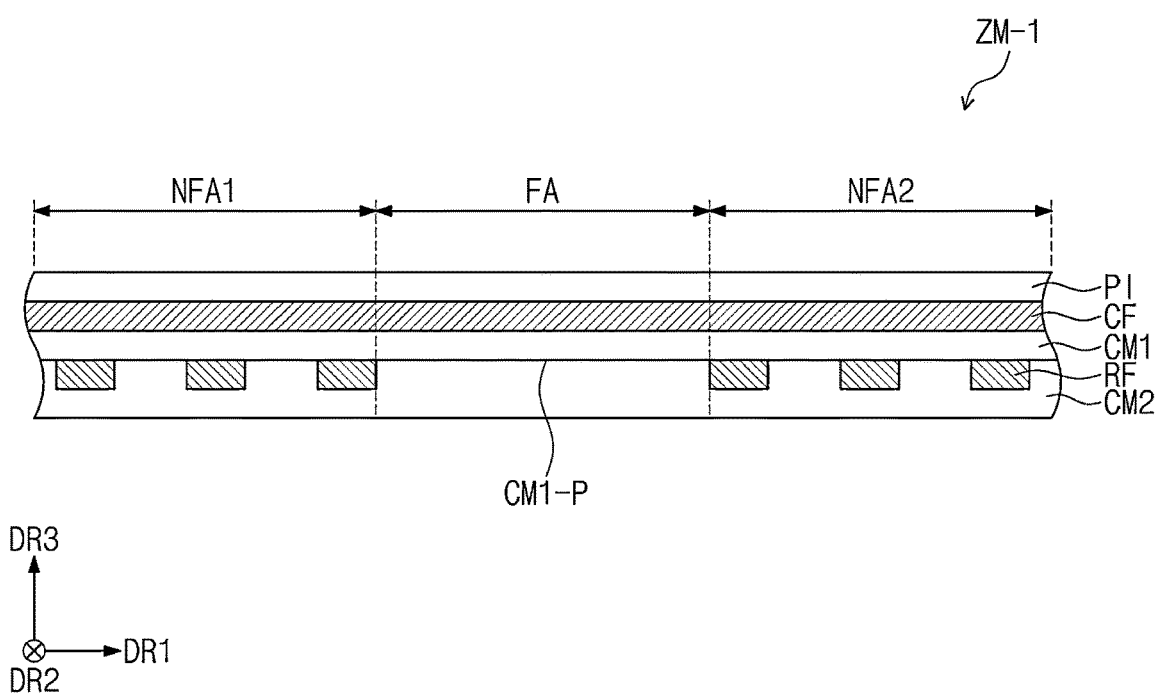
FIG. 7 is a cross-sectional view of a sensing sensor according to an embodiment of the invention.
Figure 8:
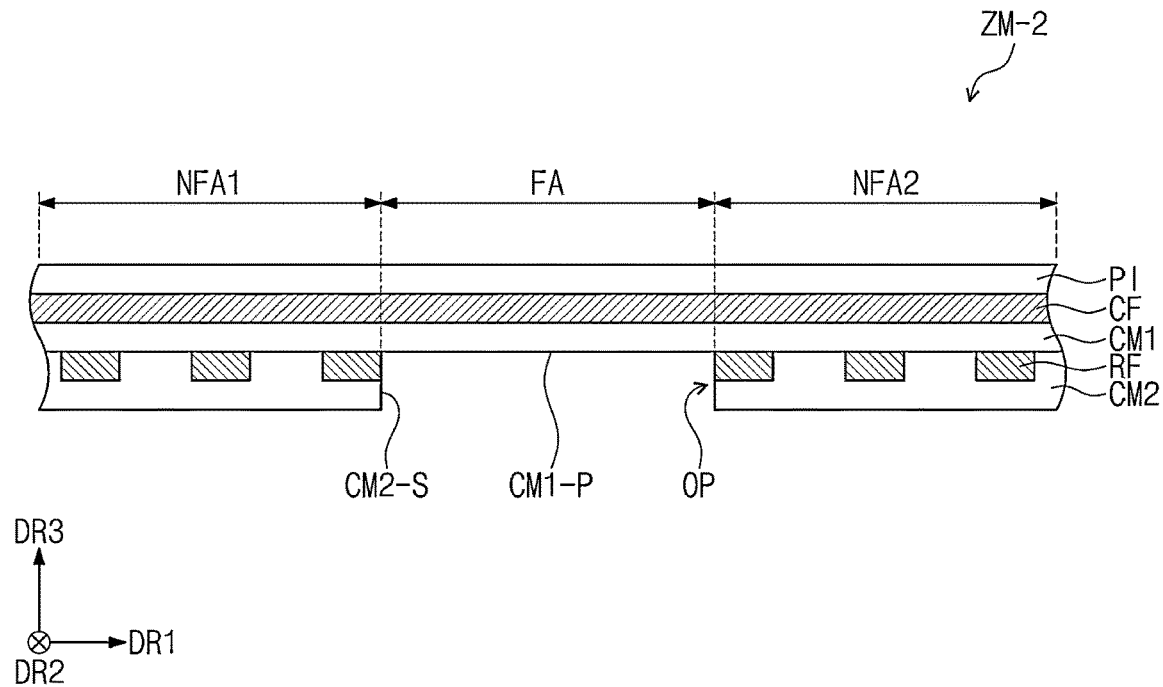
FIG. 8 is a cross-sectional view of a sensing sensor according to an embodiment of the invention.

FIG. 7 is a cross-sectional view of a sensing sensor according to an alternative embodiment of the invention. FIG. 8 is a cross-sectional view of a sensing sensor according to another alternative embodiment of the invention. The same or like reference numerals are used to indicate the same or like elements as the those described in FIGS. 1 to 6, and any repetitive detailed descriptions thereof will be omitted or simplified.

Referring to FIG. 7, an embodiment of a sensing sensor ZM-1 may include a base layer PI, first sensing coils CF, a first cover layer CM1, second sensing coils RF, and a second cover layer CM2, which are sequentially laminated one on another.

In such an embodiment, at least a portion of the second sensing coils RF may not overlap the folding area FA. In an embodiment of the invention, long sides (see FIG. 5) included in the second sensing coils RF may extend in the second direction DR2 that is the same direction as the imaginary folding axis AX1 (see FIG. 1B).

In such an embodiment, as the second sensing coils RF overlapping the folding area FA among the second sensing coils RF are omitted, the second cover layer CM2 may be in contact with a portion CM1-P of the first cover layer CM1. The portion CM1-P of the first cover layer CM1 may be defined as an area overlapping the folding area FA of the sensing sensor ZM-1.

In such an embodiment, a modulus of each of the cover layers CM1 and CM2 may be relatively less than that of the base layer PI.

In such an embodiment, the sensing sensor ZM-1 may include the folding area FA, and the coils having the long sides extending in the same direction as the folding axis AX1 may be omitted from the folding area FA to provide the sensing sensor ZM-1 having improved folding characteristics.

Referring to FIG. 8, an alternative embodiment of a sensing sensor ZM-2 may include a base layer PI, first sensing coils CF, a first cover layer CM1, second sensing coils RF, and a second cover layer CM2, which are sequentially laminated.

In such an embodiment, among the second sensing coils RF, the second sensing coils RF overlapping the folding area FA may be omitted. Thus, the second sensing coil RF may not overlap the folding area FA.

An opening OP may be defined in the second cover layer CM2. The opening OP may overlap at least a portion of the folding area FA. The opening OP may be substantially defined as a side surface CM2-S of the second cover layer CM2 exposed to the outside through the second cover layer CM2.

In such an embodiment, the portion CM1-P of the first cover layer CM1 may be exposed through the opening OP. The portion CM1-P of the first cover layer CM1 may be defined as an area overlapping the folding area FA of the sensing sensor ZM-2.

In such an embodiment, a modulus of each of the cover layers CM1 and CM2 may be relatively less than that of the base layer PI.

In an embodiment of a sensing sensor ZM-2, the second sensing coils and the second cover layer overlapping the folding area FA among the components disposed under the first cover layer CM1 may be omitted to provide the sensing sensor ZM-1 having the improved folding characteristics.

Figure 9:
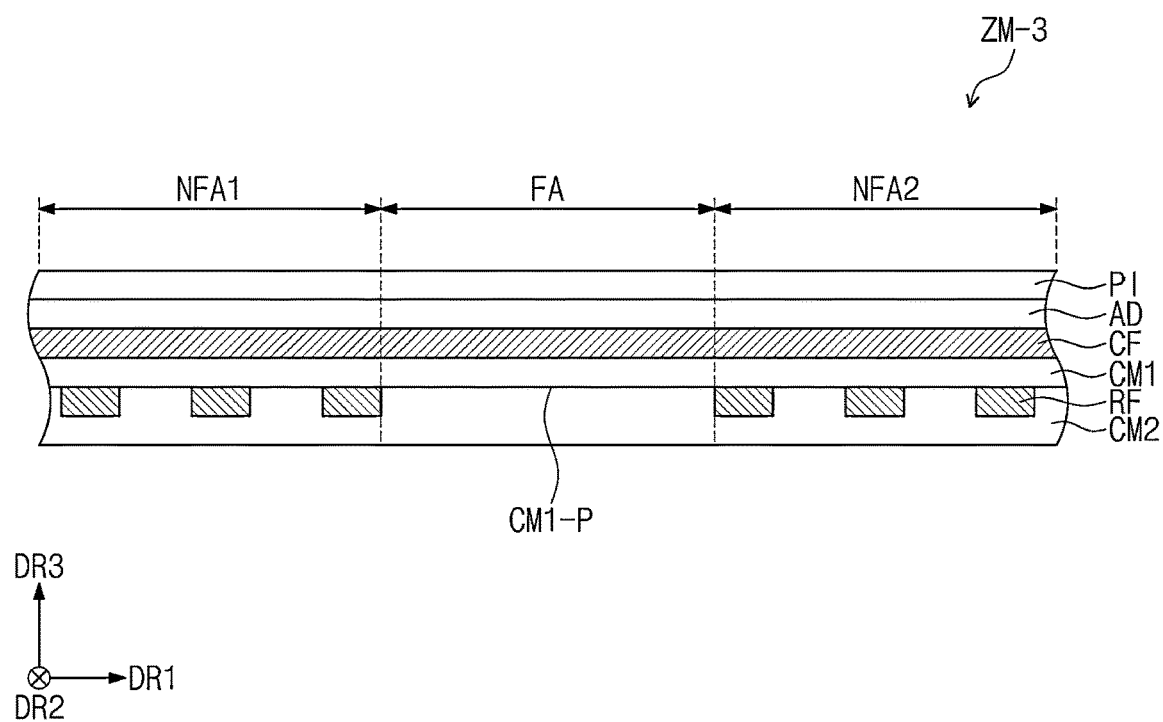
FIG. 9 is a cross-sectional view of a sensing sensor according to an embodiment of the invention.
Figure 10:
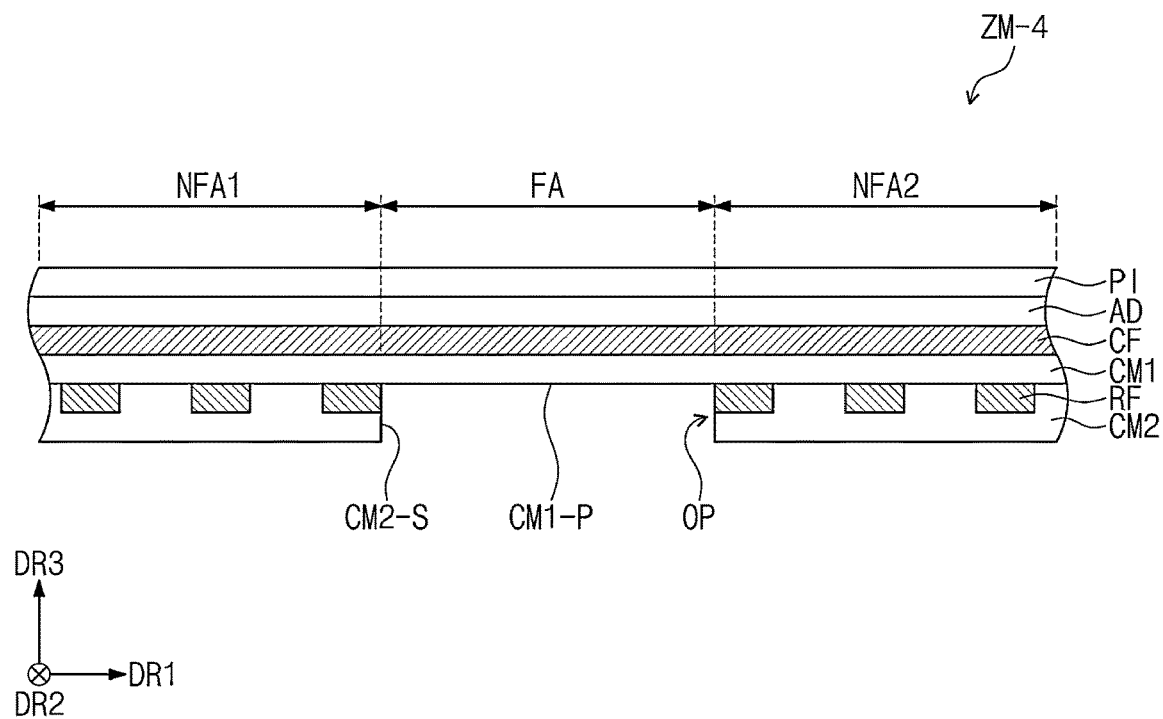
FIG. 10 is a cross-sectional view of a sensing sensor according to an embodiment of the invention.

FIG. 9 is a cross-sectional view of a sensing sensor according to an embodiment of the invention. FIG. 10 is a cross-sectional view of a sensing sensor according to an embodiment of the invention. The same or like reference numerals are used to indicate the same or like elements as those described above with reference to FIGS. 1 to 6, and any repetitive detailed descriptions thereof will be omitted or simplified.

Referring to FIG. 9, another alternative embodiment of a sensing sensor ZM-3 may include a base layer PI, an adhesive layer AD, first sensing coils CF, a first cover layer CM1, second sensing coils RF, and a second cover layer CM2, which are sequentially laminated one on another.

In such an embodiment, among the second sensing coils RF, the second sensing coils RF overlapping the folding area FA may be omitted. Thus, the second sensing coil RF may not overlap the folding area FA.

As the second sensing coils RF overlapping the folding area FA among the second sensing coils RF are omitted, the second cover layer CM2 may be in contact with a portion CM1-P of the first cover layer CM1. The portion CM1-P of the first cover layer CM1 may be defined as an area overlapping the folding area FA of the sensing sensor ZM-3.

In such embodiment, a modulus of each of the cover layers CM1 and CM2 may be relatively less than that of the base layer PI.

According to an embodiment, the sensing sensor ZM-3 may further include the adhesive layer AD disposed between the first sensing coils CF and the base layer PI to bond the first sensing coils CF to the base layer PI. In an embodiment, the adhesive layer AD may be an optically clear adhesive film OCA, an OCR, or a PSA. In an embodiment, the adhesive layer AD may include a photocurable adhesive material or a thermosetting adhesive material, but is not specifically limited thereto.

Referring to FIG. 10, another alternative embodiment of a sensing sensor ZM-4 may include a base layer PI, an adhesive layer AD, first sensing coils CF, a first cover layer CM1, second sensing coils RF, and a second cover layer CM2, which are sequentially laminated one on another.

In such an embodiment, among the second sensing coils RF, the second sensing coils RF overlapping the folding area FA may be omitted. Thus, the second sensing coil RF may not overlap the folding area FA.

An opening OP may be defined in the second cover layer CM2. The opening OP may overlap at least a portion of the folding area FA. The opening OP may be substantially defined in a way such that a side surface CM2-S of the second cover layer CM2 is exposed to the outside through the opening OP.

According to an embodiment, the portion CM1-P of the first cover layer CM1 may be exposed through the opening OP. The portion CM1-P of the first cover layer CM1 may be defined as an area overlapping the folding area FA of the sensing sensor ZM-4.

In such an embodiment, a modulus of each of the cover layers CM1 and CM2 may be relatively less than that of the base layer PI.

Also, in an embodiment, the first cover layer CM1 overlapping the folding area FA of the first cover layer CM1 may have a thickness different from that of the first cover layer CM1 on an area except for the area overlapping the folding area FA of the first cover layer CM1. In one embodiment, for example, the first cover layer CM1 overlapping the folding area FA of the first cover layer CM1 may have a thickness less than that of the first cover layer CM1 on an area except for the area overlapping the folding area FA.

Figure 11:
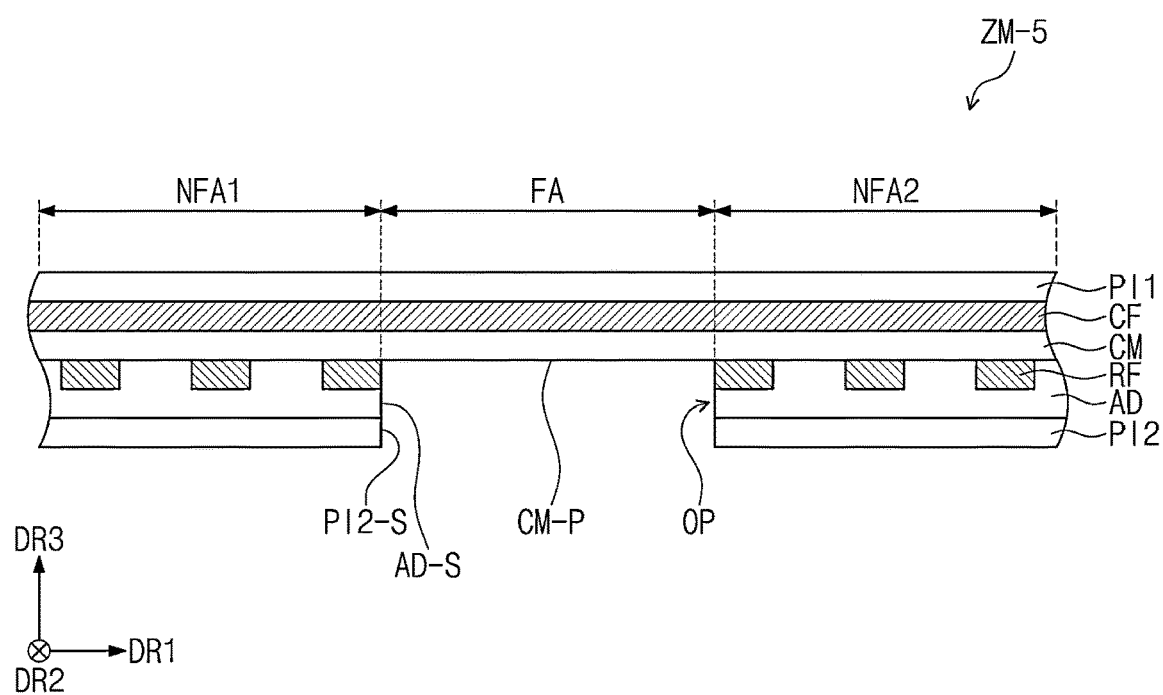
FIG. 11 is a cross-sectional view of a sensing sensor according to an embodiment of the invention.
Figure 12:
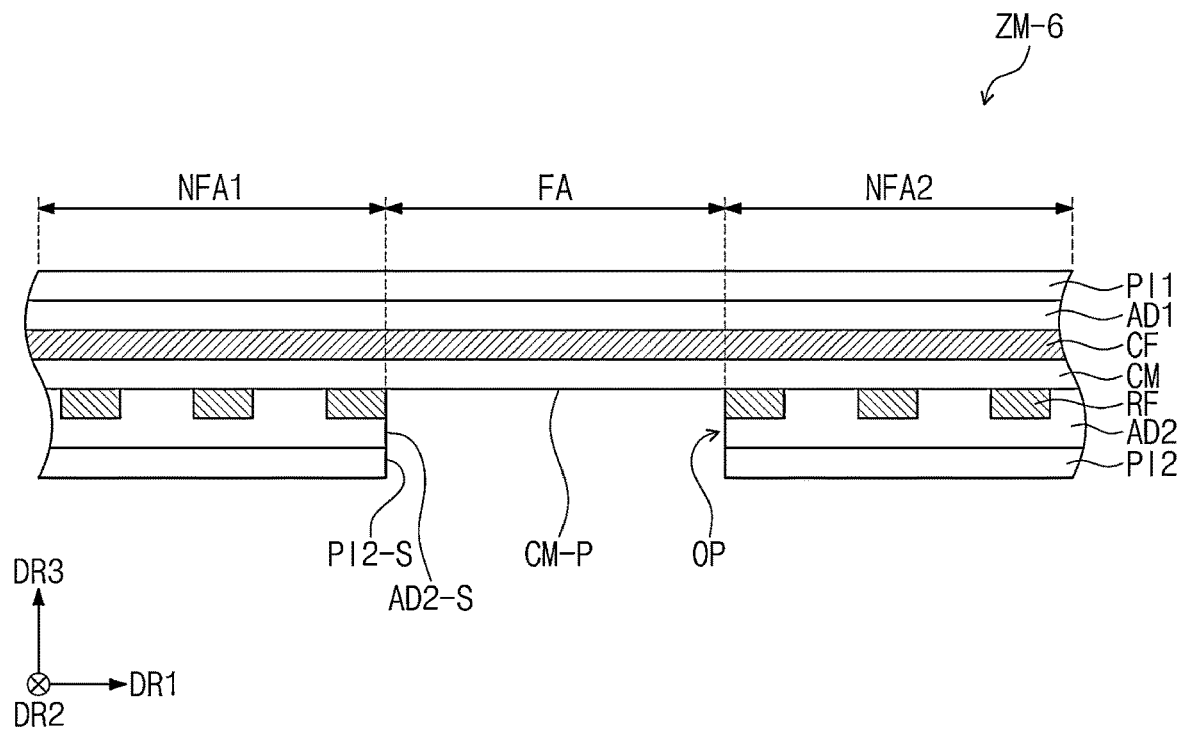
FIG. 12 is a cross-sectional view of a sensing sensor according to an embodiment of the invention.

FIG. 11 is a cross-sectional view of a sensing sensor according to an embodiment of the invention. FIG. 12 is a cross-sectional view of a sensing sensor according to an embodiment of the invention. The same or like reference numerals are used to indicate the same or like elements as those described above with reference to FIGS. 1 to 6, and any repetitive detailed descriptions thereof will be omitted or simplified.

Referring to FIG. 11, an embodiment of a sensing sensor ZM-5 may include a base layer PI, first sensing coils CF, a cover layer CM, second sensing coils RF, an adhesive layer AD, and a second base layer PI2, which are sequentially laminated one on another.

In such an embodiment, the second sensing coils RF may be covered by the adhesive layer AD to be bonded to the second base layer PI2.

In such an embodiment, among the second sensing coils RF, the second sensing coils RF overlapping the folding area FA may be omitted. Thus, the second sensing coil RF may not overlap the folding area FA.

In an embodiment of the sensing sensor ZM-5, an opening OP may be defined in a portion thereof. The opening OP may overlap at least a portion of the folding area FA. The opening OP may be substantially defined in a way such that a side surface AD-S of the second adhesive layer AD is exposed to the outside through the opening OP, and a side surface PI2-S of the second base layer PI2 is exposed to the outside through the opening OP. The side surfaces AD-S of the adhesive layer AD and the side surfaces PI2-S of the second base layer PI2 may be aligned with each other in the third direction DR3.

A portion CM-P of the cover layer CM may be exposed through the opening OP. A portion CM-P of the cover layer CM may be defined as an area overlapping the folding area FA of the sensing sensor ZM-5.

The cover layer CM disposed between the first and second base layers PI1 and PI2 may have a modulus that is relatively less than that of each of the first and second base layers PI1 and PI2.

In an embodiment, the adhesive layer AD may be an OCA, an OCR, or a PSA. In an embodiment, the adhesive layer AD may include a photocurable adhesive material or a thermosetting adhesive material, but is not specifically limited thereto.

Each of the first base layer PI1 and the second base layer PI2 may include PI).

Referring to FIG. 12, an embodiment of a sensing sensor ZM-6 may include a base layer PI, a first adhesive layer AD1, first sensing coils CF, a cover layer CM, second sensing coils RF, a second adhesive layer AD2, and a second base layer PI2, which are sequentially laminated one on another.

In such an embodiment, the first sensing coils CF may be covered by the first adhesive layer AD1 and bonded to the first base layer PI1, and the second sensing coils RF may be covered by the second adhesive layer AD2 and bonded to the second base layer PI2.

In such an embodiment, among the second sensing coils RF, the second sensing coils RF overlapping the folding area FA may be omitted. Thus, the second sensing coil RF may not overlap the folding area FA.

In an embodiment of the sensing sensor ZM-6, an opening OP may be defined in a portion thereof. The opening OP may overlap at least a portion of the folding area FA. The opening OP may be substantially defined in a way such that a side surface AD-S of the second adhesive layer AD2 is exposed to the outside through the opening OP, and a side surface PI2-S of the second base layer PI2 is exposed to the outside through the opening OP. The side surfaces AD2-S of the second adhesive layer AD2 and the side surfaces PI2-S of the second base layer PI2 may be aligned with each other in the third direction DR3.

A portion CM-P of the cover layer CM may be exposed through the opening OP. A portion CM-P of the cover layer CM may be defined as an area overlapping the folding area FA of the cover layer CM.

The cover layer CM disposed between the first and second base layers PI1 and PI2 may have a modulus that is relatively less than that of each of the first and second base layers PI1 and PI2.

In an embodiment, each of the adhesive layers AD1 and AD2 may be an OCA, an OCR, or a PSA. In an embodiment, each of the adhesion layer AD1 and AD2 may include a photocurable adhesive material or a thermosetting adhesive material, but is not specifically limited thereto.

Each of the first base layer PI1 and the second base layer PI2 may include P).

Figure 13:
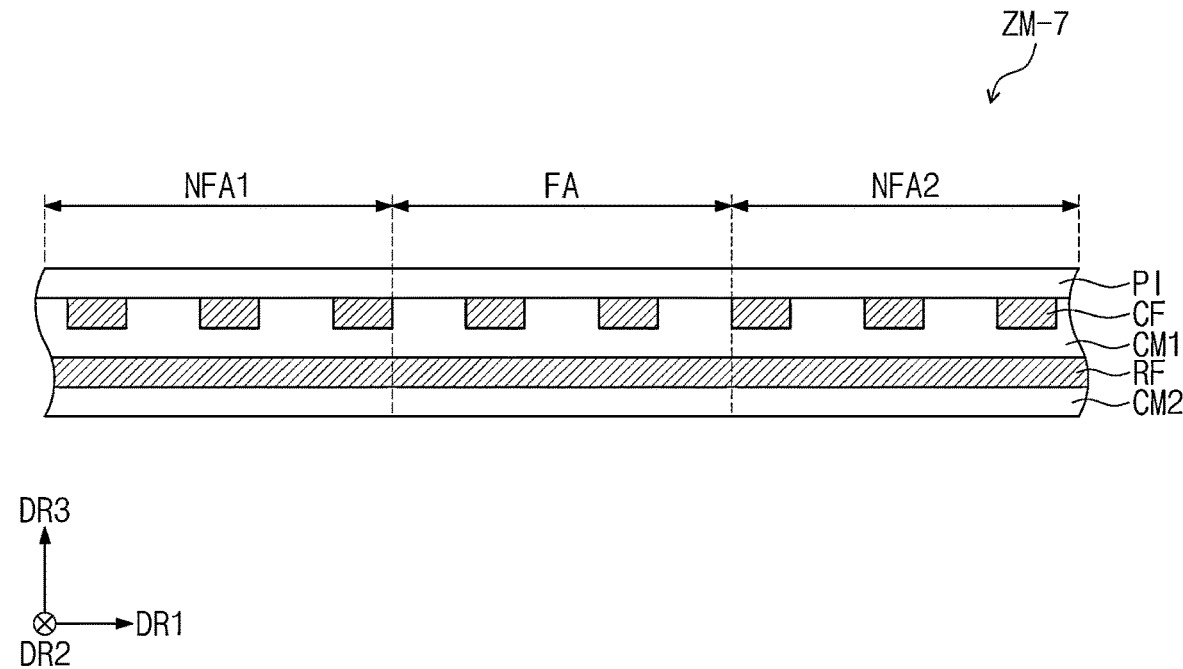
FIG. 13 is a cross-sectional view of a sensing sensor according to an embodiment of the invention.
Figure 14:
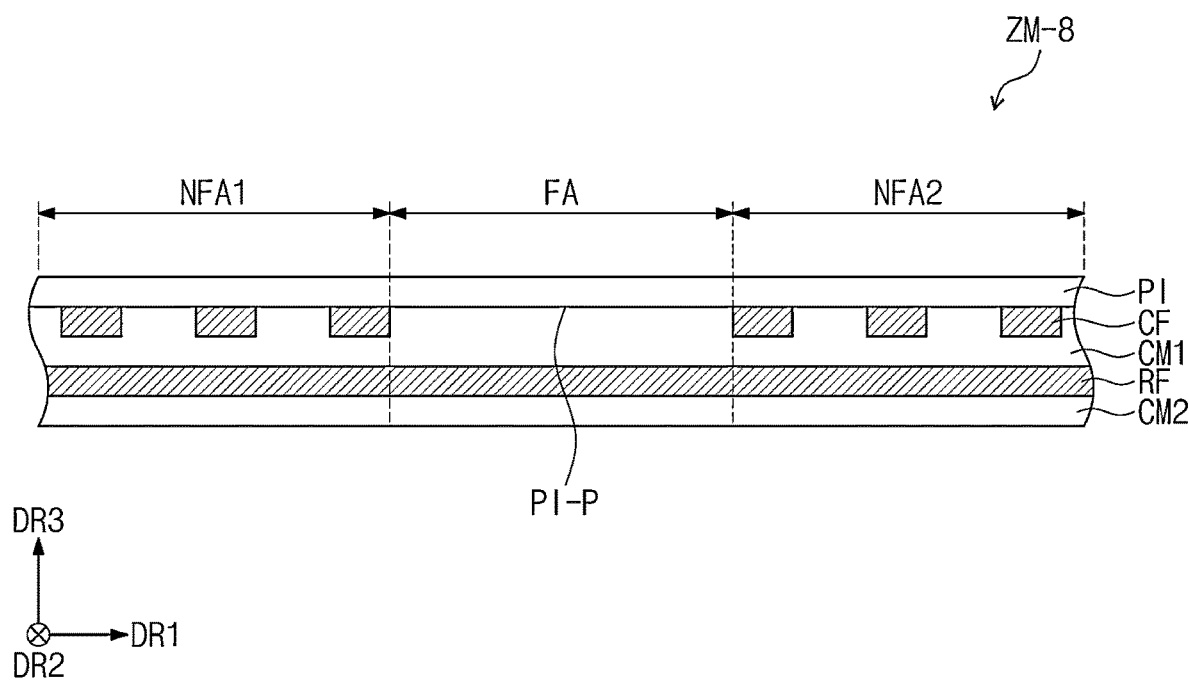
FIG. 14 is a cross-sectional view of a sensing sensor according to an embodiment of the invention.

FIG. 13 is a cross-sectional view of a sensing sensor according to an embodiment of the invention. FIG. 14 is a cross-sectional view of a sensing sensor according to an embodiment of the invention. The same or like reference numerals are used to indicate the same or like elements as those described above with reference to FIGS. 1 to 6, and any repetitive detailed descriptions thereof will be omitted or simplified.

FIGS. 12 and 13 are cross-sectional views of long sides included in each of the sensing coils.

Referring to FIG. 13, an embodiment of a sensing sensor ZM-7 may include a base layer PI, first sensing coils CF, a first cover layer CM1, second sensing coils RF, and a second cover layer CM2, which are sequentially laminated.

In such an embodiment, when the electronic apparatus EA is in-folded, the first sensing coils CF may be defined as coils relatively adjacent to the folding axis AX1 (see FIG. 1B), and the second sensing coils RF may be defined as coils spaced apart from the folding axis AX1 with respect to the first sensing coils CF.

The first sensing coils CF may extend in the second direction DR2, which is an extension direction of the folding axis AX1 and may be arranged to be spaced apart from each other along the first direction DR1.

The second sensing coils RF may extend in the first direction DR1 crossing the extending direction of the folding axis AX1 and may be arranged to be spaced apart from each other along the second direction DR2.

Referring to FIG. 14, an embodiment of a sensing sensor ZM-8 may include a base layer PI, first sensing coils CF, a first cover layer CM1, second sensing coils RF, and a second cover layer CM2, which are sequentially laminated. An arrangement relationship between the first sensing coils CF and the second sensing coils RF may be the same as between the first sensing coils CF and the second sensing coils RF, which are included in the sensing sensor ZM-7 of FIG. 13.

In such an embodiment, the first sensing coils CF overlapping the folding area FA of the first sensing coils CF may be omitted. Thus, the first cover layer CM1 may be in contact with a portion PI-P of the base layer PI. The portion PI-P of the base layer PI may be defined as an area overlapping the folding area FA of the sensing sensor ZM-8.

Figure 15:
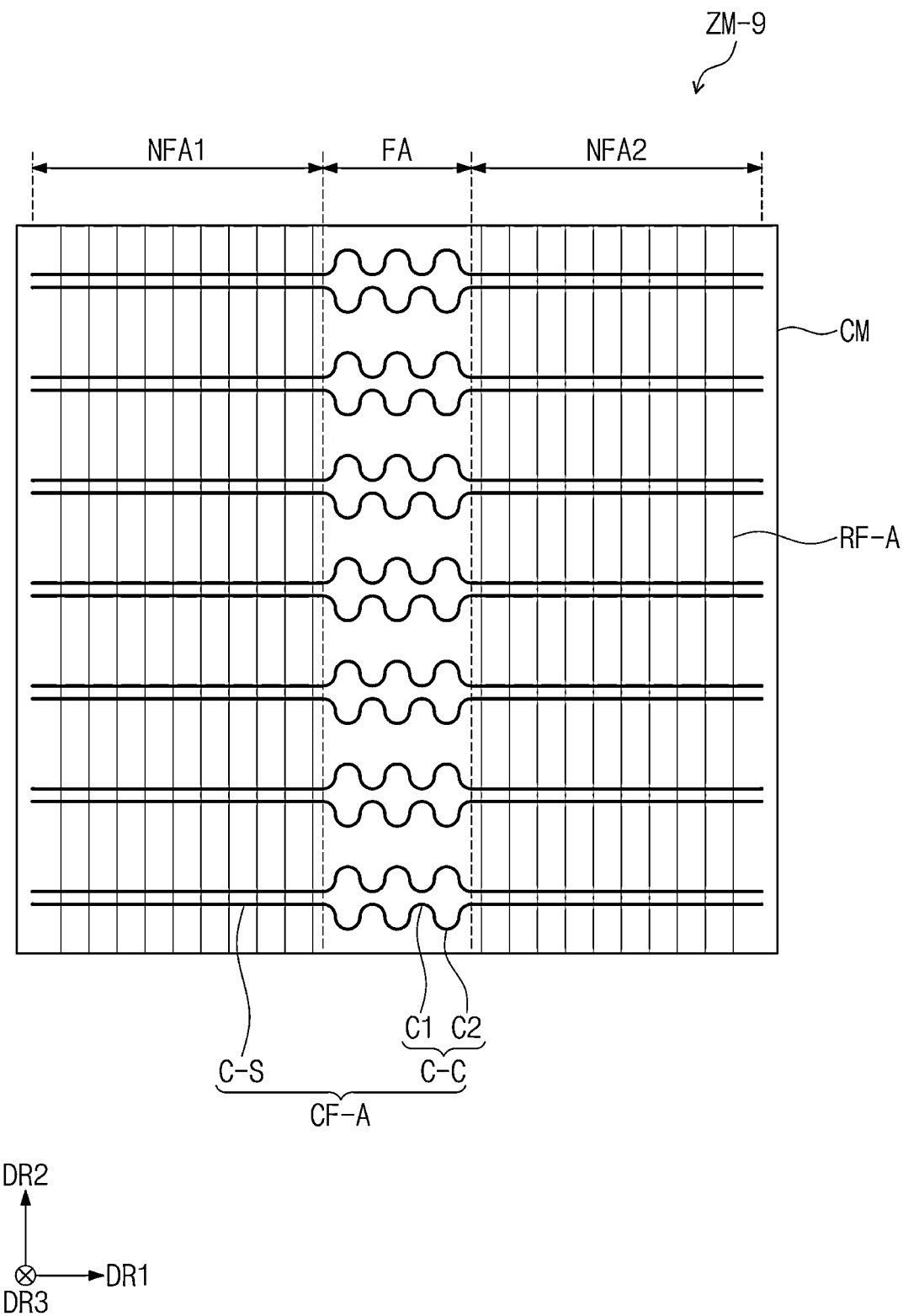
FIG. 15 is a plan view of the sensing sensor according to an embodiment of the invention.

FIG. 15 is a plan view of the sensing sensor according to an embodiment of the invention. The same or like reference numerals are used to indicate the same or like elements as those described above with reference to FIGS. 1 to 6, and any repetitive detailed descriptions thereof will be omitted or simplified.

Referring to FIG. 15, an embodiment of a sensing sensor ZM-9 may include first sensing coils CF-A disposed on a cover layer CM and second sensing coils RF-A disposed under the cover layer CM. A base layer (not shown) may be disposed on the cover layer CM, and one of the base layer and a cover layer (not shown) including a same material as the cover layer CM described above may be disposed under the cover layer CM to cover the sensing coils.

The first sensing coils CF may include extension parts C-S and pattern parts C-C. One of the extension parts C-S may overlap a first non-folding area NFA1, and another of the extension parts C-S may overlap a second non-folding area NFA2. Each of the extension parts C-S may extend in the first direction DR1 and may not overlap a folding area FA.

The pattern part C-C may be disposed between the extension parts C-S. The pattern part C-C may overlap the folding area FA and connect the extension parts C-S, which are spaced apart from each other, to each other.

The pattern parts C-C may have a convex shape C1 and a concave shape C2, which are alternately disposed with each other. Therefore, the pattern parts may have a wave-like shape on a plane.

The pattern parts between the adjacent first sensing coils CF may have the convex shape C1 and the concave shape C2, which are opposite to each other. In one embodiment, for example, the convex shape C1 included in one of the first sensing coils may face the concave shape C2 included in the other first sensing coil disposed adjacent in the second direction DR2, and the concave shape C2 included in one of the first sensing coils may face the convex shape C1 included in the other first sensing coil.

According to an embodiment, since the coils crossing the folding area FA include the pattern part C-C having a predetermined shape, stress applied to the sensing sensor ZM-9 during folding may be alleviated.

The second sensing coils RF may extend in the second direction DR2 and be spaced apart from each other along the first direction DR1. The second sensing coil RF may not overlap the folding area FA.

According to embodiments of the invention, when the electronic apparatus is in-folded, the cover layer disposed at the relatively outside portion with respect to the folding axis may have a modulus less than a modulus of the base layer disposed more adjacent to the display module than the cover layer to reduce the stress applied to the sensing sensor in the folded state. Therefore, the cracks may be effectively prevented from occurring in the cover layer overlapping the folding area among the cover layers, and accordingly, the electronic apparatus including the sensing sensor having the improved folding characteristics may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. An electronic apparatus comprising:
a display module divided into a first non-folding area, a folding area foldable along an imaginary folding axis extending in a second direction crossing a first direction, and a second non-folding area, which are sequentially arranged in the first direction; and
a sensing sensor comprising a first base layer disposed under the display module, first sensing coils disposed on the first base layer, second sensing coils insulated from the first sensing coils, and a first cover layer disposed between the first sensing coils and the second sensing coils,
wherein a modulus of the first cover layer is less than a modulus of the first base layer.

2. The electronic apparatus of claim 1, wherein
the sensing sensor further comprises a second cover layer disposed on the first cover layer to cover the second sensing coils, and
a modulus of the second cover layer is less than the modulus of the first base layer.

3. The electronic apparatus of claim 2, wherein the second sensing coils do not overlap the folding area.

4. The electronic apparatus of claim 3, wherein
an opening is defined through the second cover layer to overlap the folding area such that a side surface of the second cover layer is exposed through the opening, and
a portion of the first cover layer overlapping the folding area of the first cover layer is exposed through the opening.

5. The electronic apparatus of claim 3, further comprising:
an adhesive layer disposed between the first base layer and the first cover layer to cover the first sensing coils,
wherein the adhesive layer bonds the first base layer to the first cover layer.

6. The electronic apparatus of claim 5, wherein
an opening is defined through the second cover layer to overlap the folding area such that a side surface of the second cover layer is exposed through the opening, and
a portion of the first cover layer overlapping the folding area of the first cover layer is exposed through the opening.

7. The electronic apparatus of claim 1, wherein the sensing sensor comprises:
an adhesive layer disposed on the first cover layer to cover the second sensing coils and a second base layer disposed on the adhesive layer,
wherein an opening is defined through the adhesive layer and the second base layer to overlap the folding area such that side surfaces of the adhesive layer and the second base layer are exposed through the opening, and
a portion of the first cover layer overlapping the folding area of the first cover layer is exposed through the opening.

8. The electronic apparatus of claim 7, further comprising:
an additional adhesive layer disposed between the first base layer and the first cover layer to cover the first sensing coils,
wherein the additional adhesive layer bonds the first base layer to the first cover layer.

9. The electronic apparatus of claim 1, wherein
the first sensing coils comprise first long sides extending in the first direction and spaced apart from each other along the second direction and a first short side extending along the second direction and disposed between the first long sides, and
the second sensing coils comprise second long sides extending in the second direction and spaced apart from each other along the first direction and a second short side extending along the first direction and disposed between the second long sides.

10. The electronic apparatus of claim 1, wherein
the first sensing coils comprise first long sides extending in the second direction and spaced apart from each other along the first direction and a first short side extending along the first direction and disposed between the first long sides, and
the second sensing coils comprise second long sides extending in the first direction and spaced apart from each other along the second direction and a second short side extending along the second direction and disposed between the second long side.

11. The electronic apparatus of claim 10, wherein the first sensing coils do not overlap the folding area.

12. The electronic apparatus of claim 11, wherein each of the first sensing coils comprises:

extension parts overlapping the first non-folding area and the second non-folding area and extending in the first direction; and a pattern part overlapping the folding area, disposed between the extension parts, and including a concave shape and a convex shape, which are alternately disposed with each other.

13. The electronic apparatus of claim 12, wherein the second sensing coils do not overlap the folding area.

14. The electronic apparatus of claim 2, wherein
the first base layer comprises polyimide, and
the second cover layer comprises synthetic rubber,
wherein the synthetic rubber comprises at least one selected from butadiene rubber, styrene-butadiene rubber, and butyl rubber.

15. The electronic apparatus of claim 14, wherein the first cover layer has a modulus in a range of about 10 Mpa to about 100 Mpa.

16. A sensing sensor comprising:
a first base layer divided into a first non-folding area, a folding area foldable along an imaginary folding axis extending along a second direction crossing a first direction, and a second non-folding area, which are sequentially arranged in the first direction, wherein the first base layer comprises polyimide;
first sensing coils disposed on the first base layer;
a first cover layer disposed on the first base layer to cover the first sensing coils; and
second sensing coils disposed on the first cover layer,
wherein the first cover layer comprises synthetic rubber.

17. The sensing sensor of claim 16, wherein the synthetic rubber comprises at least one selected from butadiene rubber, styrene-butadiene rubber, and butyl rubber.

18. The sensing sensor of claim 17, further comprising:
a second cover layer disposed on the first cover layer to cover the second sensing coils, wherein the second cover layer comprises a same material as the first cover layer.

19. The sensing sensor of claim 18, wherein the second sensing coils do not overlap the folding area.

20. The sensing sensor of claim 19, wherein
an opening is defined through the second cover layer to overlap the folding area such that a side surface of the second cover layer is exposed through the opening, and
a portion of the first cover layer overlapping the folding area of the first cover layer is exposed through the opening.

* * * * *